(12) United States Patent
Suzuki

(10) Patent No.: US 11,529,684 B2
(45) Date of Patent: Dec. 20, 2022

(54) METAL LAMINATING/SHAPING DEVICE

(71) Applicant: TOSHIBA MITSUBISHI-ELECTRIC INDUSTRIAL SYSTEMS CORPORATION, Chuo-ku (JP)

(72) Inventor: Norihiro Suzuki, Tokyo (JP)

(73) Assignee: TOSHIBA MITSUBISHI-ELECTRIC INDUSTRIAL SYSTEMS CORPORATION, Tokyo (JP)

( * ) Notice: Subject to any disclaimer, the term of this patent is extended or adjusted under 35 U.S.C. 154(b) by 839 days.

(21) Appl. No.: 16/088,870

(22) PCT Filed: Mar. 29, 2016

(86) PCT No.: PCT/JP2016/060053
§ 371 (c)(1),
(2) Date: Sep. 27, 2018

(87) PCT Pub. No.: WO2017/168548
PCT Pub. Date: Oct. 5, 2017

(65) Prior Publication Data
US 2020/0156151 A1    May 21, 2020

(51) Int. Cl.
*B22F 10/20*    (2021.01)
*B29C 64/295*    (2017.01)
(Continued)

(52) U.S. Cl.
CPC ............ *B22F 10/20* (2021.01); *B29C 64/295* (2017.08); *B33Y 10/00* (2014.12); *B22F 3/16* (2013.01);
(Continued)

(58) Field of Classification Search
CPC ........ B22F 10/20; B22F 12/00; B29C 64/295; B29C 48/03; B29C 48/04; B29C 48/05; B29C 48/06; B29C 64/386; B29C 64/393; B29C 64/141; B33Y 50/02; B33Y 30/00
See application file for complete search history.

(56) References Cited

U.S. PATENT DOCUMENTS

2009/0314391 A1* 12/2009 Crump ................... B33Y 10/00
148/523
2016/0194233 A1* 7/2016 Van Pelt ............... B29C 64/118
65/32.4
(Continued)

FOREIGN PATENT DOCUMENTS

JP     11-508322 A    7/1999
JP     2002-97561 A    4/2002
(Continued)

OTHER PUBLICATIONS

Japanese Office Action dated Jul. 2, 2019 in Patent Application No. 2018-507868 (with English translation), 6 pages.
(Continued)

*Primary Examiner* — Philip C Tucker
*Assistant Examiner* — Jimmy R Smith, Jr.
(74) *Attorney, Agent, or Firm* — Xsensus LLP

(57) ABSTRACT

A metal laminating/shaping device includes a base, a head unit including a base material injection device, and drive devices that change a positional relationship between the base and the head unit in a spatial coordinate system. The base material injection device includes a base material heating unit that heats a base material that is a metal piece having a fixed shape such that a temperature of an interior of the base material is raised to a temperature below a melting point and a temperature of a surface of the base material is raised to the melting point, and a base material injection unit that injects the heated base material toward the base. The metal laminating/shaping device can form a metal shaped article having a complicated structure at a low cost.

14 Claims, 26 Drawing Sheets

(51) Int. Cl.
*B33Y 30/00* (2015.01)
*B29C 64/153* (2017.01)
*B33Y 10/00* (2015.01)
B33Y 50/02 (2015.01)
B22F 3/16 (2006.01)
B22F 10/30 (2021.01)

(52) U.S. Cl.
CPC ........... *B22F 10/30* (2021.01); *B22F 2998/10* (2013.01); *B22F 2999/00* (2013.01); *B29C 64/153* (2017.08); *B33Y 30/00* (2014.12); *B33Y 50/02* (2014.12)

(56) References Cited

U.S. PATENT DOCUMENTS

| 2017/0312855 A1* | 11/2017 | Hooper | C23C 14/5873 |
| 2019/0061057 A1* | 2/2019 | Brunhuber | B23K 15/0086 |

FOREIGN PATENT DOCUMENTS

| JP | 2015-85547 A | 5/2015 |
| WO | WO 2015/141782 A1 | 9/2015 |
| WO | WO 2015/151831 A1 | 10/2015 |

OTHER PUBLICATIONS

International Preliminary Report on Patentability and Written Opinion dated Oct. 11, 2018 in PCT/JP2016/060053 (English Translation only), 7 pages.
Chinese Office Action dated Mar. 9, 2020, issued in corresponding Chinese Patent Application No. 201680084033.6.
International Search Report dated Jun. 28, 2016 on PCT/JP2016/060053 filed Mar. 29, 2016.
Office Action dated Jan. 14, 2020, issued in corresponding Japanese Patent Application No. 2018-507868, 7 pages with English Translation.

* cited by examiner (A) (B) (C) (D)

METAL LAMINATING/SHAPING DEVICE

FIELD

The present disclosure relates to a metal laminating/shaping device.

BACKGROUND

A three-dimensional laminating/shaping device to which a fused deposition modeling (FDM) method is applied has been known, as disclosed, for example, in PTL 1. The three-dimensional laminating/shaping device to which the FDM method is applied performs laminating and shaping by melting a thread-shaped thermoplastic resin with a heater in a shaping head, controlling injection of the melted thermoplastic resin, and lifting and lowering a shaping table.

A three-dimensional laminating/shaping device to which a powder shaping method is applied has also been known. The three-dimensional laminating/shaping device to which the powder shaping method is applied forms one layer of a shaped article by causing a recoater unit to coat powder corresponding to one layer on a shaping table and then causing a print head unit to apply a binder (bonding agent) onto the coated power surface.

The applicant has recognized the following documents as those relating to the present disclosure including the document described above.

CITATION LIST

Patent Literature

[PTL 1] WO 2015/141782 A
[PTL 2] WO 2015/151831 A

SUMMARY

Technical Problem

To form a metal shaped article having a complicated structure, a cast article manufacturing method has been used, the method including creating a mold with sand, pouring a melted metal into the mold, cooling the mold and then destroying the mold in such a way that only the metal shaped article is left. The cast article manufacturing method needs a mold lager than a final product, has a high degree of difficulty in terms of precision, and requires one mold for each product. The cast article manufacturing method, in which a completely melted metal needs to be poured into a mold, requires a large amount of thermal energy for formation of a shaped article having a complicated structure with a high-melting-point metal. Also in the three-dimensional laminating/shaping device described above, a resin needs to be completely melted, and a large amount of thermal energy is similarly required to completely melt a metal.

The present disclosure has been made to solve the problems described above. An object of the present disclosure is to provide a metal laminating/shaping device capable of forming a metal shaped article having a complicated structure at a low cost.

Solution to Problem

To achieve the object described above, the present disclosure relates to a metal laminating/shaping device including
  a base,
  a head unit including a base material injection device, and
  a drive device that changes a positional relationship between the base and the head unit in a spatial coordinate system,
  the base material injection device including
    a base material heating unit that heats a base material that is a metal piece having a fixed shape in such a way that a temperature of an interior of the base material is raised to a temperature below a melting point and a temperature of a surface of the base material is raised to the melting point, and
    a base material injection unit that injects the heated base material toward the base.

It is preferable that the head unit further includes an auxiliary material injection device that injects an auxiliary material different from the base material injected by the base material injection device in terms of a material type.

It is preferable that the head unit further includes a heating device that heats a surface of a laminated base material laminated on the base.

It is preferable that the head unit further includes a cooling device that cools a surface of a laminated base material laminated on the base.

Advantageous Effects of Invention

According to the present disclosure, a metal piece having a fixed shape and heated so that the temperature of the interior is raised to a temperature below the melting point and the temperature of the surface is raised to the melting point can be injected toward the base. The injected base materials, in each of which only the surface is melted and the interior of the base material remains solid so that the thermal energy is reduced, can be welded to each other. Therefore, according to the present disclosure, a metal shaped article having a complicated structure can be formed at a low cost by laminating the injected base materials on each other without use of a furnace or a large mold.

Further, a metal shaped article having a more complicated internal structure can be formed by using the auxiliary material injection device. Moreover, the metal composition (metal crystal structure) of the surface of the laminated base material can be adjusted by a thermal treatment by using the heating device and the cooling device.

DESCRIPTION OF EMBODIMENTS

Figure 1:
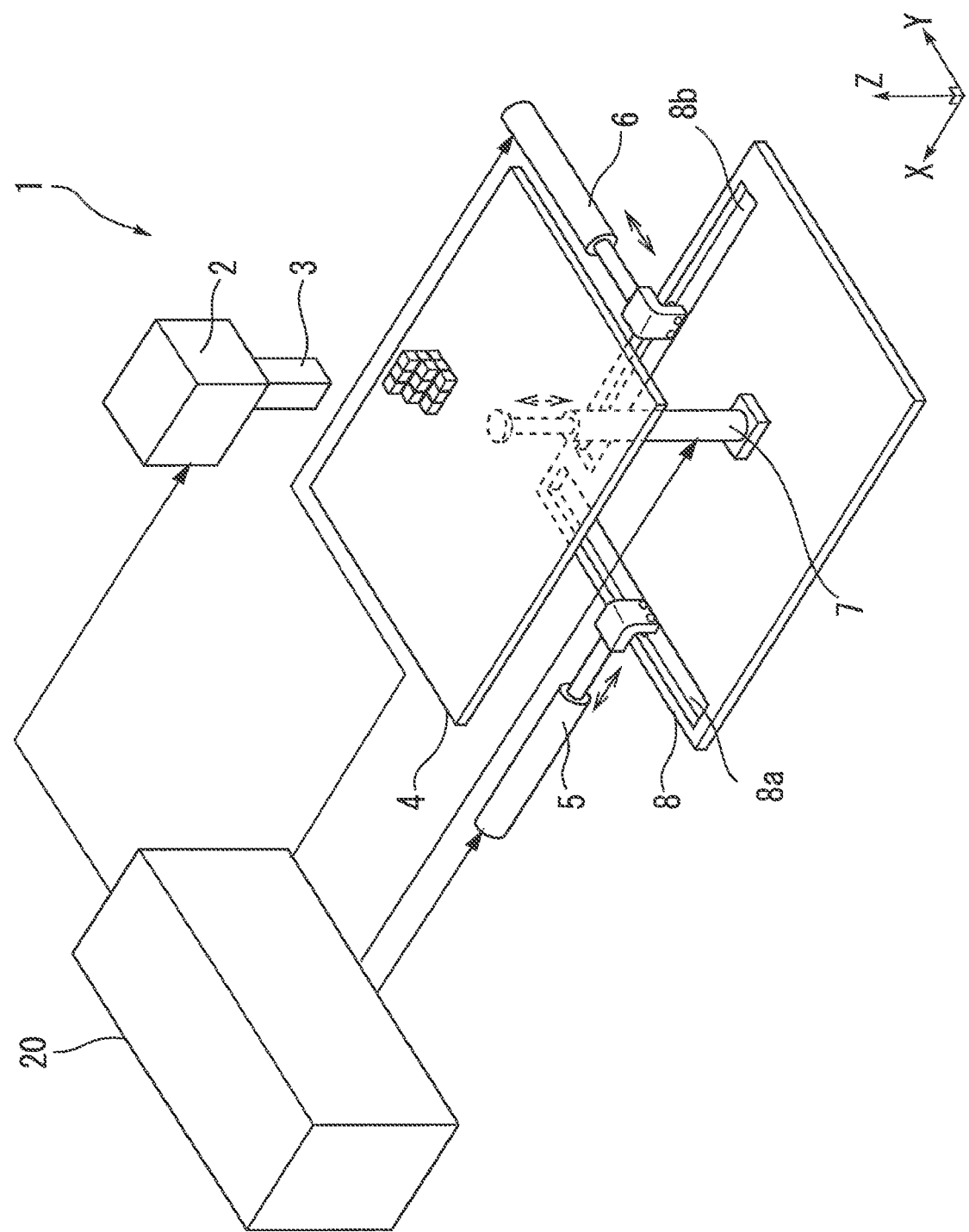
FIG. 1 is a conceptual view for describing the configuration of a system according to a first embodiment.

Embodiments of the present disclosure will be described below in detail with reference to the drawings. Common elements throughout the drawings have the same reference character, and redundant description thereof will be omitted.

First Embodiment

<System Configuration>

FIG. 1 is a conceptual view for describing the configuration of a system according to a first embodiment. The system shown in FIG. 1 includes a metal laminating/shaping device 1.

The metal laminating/shaping device 1 shown in FIG. 1 includes a material supply device 2, a head unit 3, a base 4, an X-axis actuator 5, a Y-axis actuator 6, a Z-axis actuator 7, a moving bench 8, and a control device 20. The metal laminating/shaping device 1 is a device that sequentially injects a material from the head unit 3 toward the base 4 and laminates the materials on each other to form a shaped article.

The material supply device 2 supplies the head unit 3 with a material. The supplied material is loaded into the head unit 3, and the head unit 3 injects the loaded material toward the base 4. The base 4 is a shaping stage having heat resistance and adiabaticity. The injected material collides with the upper surface of the base 4 and is fixed thereto.

The X-axis actuator 5, the Y-axis actuator 6, the Z-axis actuator. 7, and the moving bench 8 are each a drive device that changes the positional relationship between the base 4 and the head unit 3 in a spatial coordinate system. In the example shown in FIG. 1, the position of the head unit 3 is stationary, and the drive devices change the position of the base 4.

In the present specification, the X axis is parallel to the upper surface of the base 4. The Y axis is parallel to the upper surface of the base 4 and perpendicular to the X axis. The Z axis is perpendicular to the upper surface of the base 4.

A front end portion of the X-axis actuator 5 engages with a hole 8a, which is elongated in the Y-axis direction. A front end portion of the Y-axis actuator 6 engages with a hole 8b, which is elongated in the X-axis direction. The moving bench 8 is therefore movable in the X-axis direction in accordance with force received from the X-axis actuator 5 and movable in the Y-axis direction in accordance with force received from the Y-axis actuator 6.

The Z-axis actuator 7 has one end fixed to the base 4 and the other end fixed to the moving bench 8. The base 4 linked to the moving bench 8 is therefore movable in the X-axis direction in accordance with the force received from the X-axis actuator 5, movable in the Y-axis direction in accordance with force received from the Y-axis actuator 6, and movable in the Z-axis direction in accordance with force received from the Z-axis actuator 7.

Figure 2:
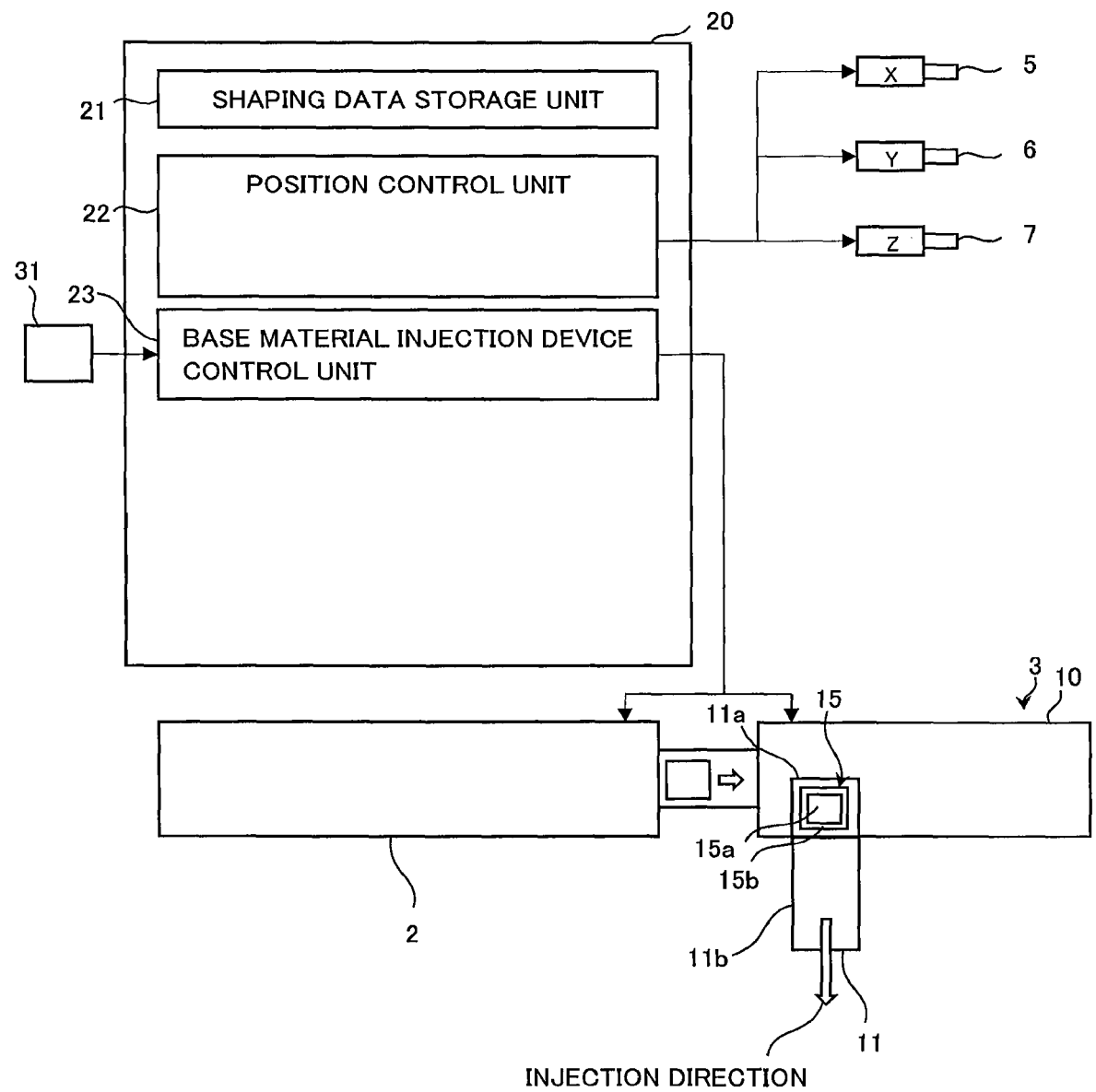
FIG. 2 is a block diagram for describing a head unit 3 and a control device 20 of a metal laminating/shaping device 1 in the first embodiment.

FIG. 2 is a block diagram for describing the head unit 3 and the control device 20 of the metal laminating/shaping device 1 in the first embodiment.

The material supply device 2 supplies the head unit 3 with a material. In the first embodiment, the material is a base material 15, which is a metal piece having a fixed shape. The metal is steel (including stainless steel), iron, copper, aluminum, nickel, or the like.

Figure 3:
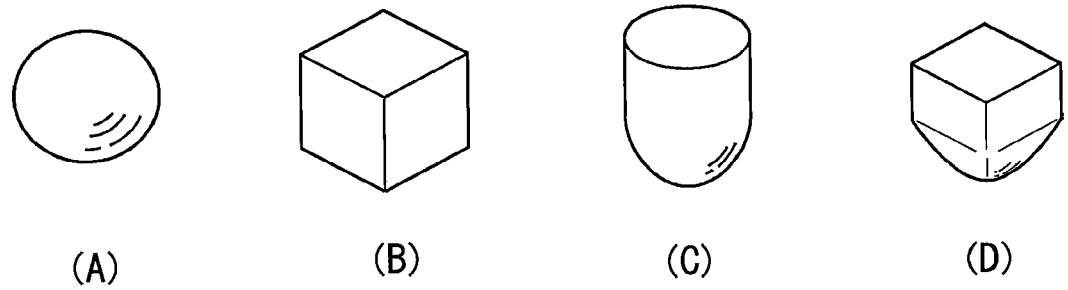
FIG. 3 shows examples of the shape of a material.

FIG. 3 shows examples of the shape of the material. The material has, for example, (A) a spherical shape, (B) a cuboid shape, (C) a bullet-like shape in which a cone is added to the lower surface of a circular column, or (D) a bullet-like shape in which a regular pyramid is added to the lower surface of a cuboid. When the material having any of the bullet-like shapes collides with the base 4, a front end portion of the material is crushed so that the material has a shape close to a circular column or a cuboid. The length of one side (or diameter) of the material ranges from 1 millimeter to several centimeters.

Referring back to FIG. 2, the description of the head unit 3 and the control device 20 is resumed. The head unit 3 includes an attachment unit 10 and a base material injection device 11, which is attached to the attachment unit 10. The base material 15 supplied to the head unit 3 is loaded into the base material injection device 11. The base material injection device 11 includes a base material heating unit 11a and a base material injection unit 11b.

The base material heating unit 11a heats a surface (surface layer) 15b of the loaded base material 15. The base material heating unit 11a needs to instantly heat the surface 15b of the base material 15 with a large amount of energy to heat only the surface 15b. The base material heating unit 11a can, for example, be a heating device to which eddy current produced by an electromagnetic coil is applied or a heating device using a laser beam. The thickness of the surface (surface layer) 15b is several percent (0.1% to 10%) of the length of one side (or diameter) of the material.

The base material heating unit 11a further includes a base material temperature sensor 31. The base material temperature sensor 31 outputs a temperature signal according to the temperature of the surface of the base material 15 loaded in the base material heating unit 11a. The base material temperature sensor 31 can, for example, be an infrared thermometer capable of measuring the temperature of the surface 15b of the base material 15 in a contactless manner.

The base material injection unit 11b injects the loaded base material 15. The injection line of the base material injection unit 11b is directed toward the base 4. The base material injection unit 11b can, for example, be a device that injects an object with the aid of compressed air or a device (rail gun) that accelerates an object based on electromagnetic induction (Lorentz force) and ejects the object.

The control device 20 includes a shaping data storage unit 21, a position control unit 22, and a base material injection device control unit 23. An input unit of the control device 20 is connected to the base material temperature sensor 31, and an output unit of the control device 20 is connected to the material supply device 2, the head unit 3, the X-axis actuator 5, the Y-axis actuator 6, and the Z-axis actuator 7.

The shaping data storage unit 21 stores shaping data in advance. The shaping data contains N sets of process data ranging from data used at the start of shaping to data used at the end thereof. The process data sets are each arranged in the execution order.

The process data sets each contain at least a device name and spatial coordinates. The process data containing the base material injection device 11 as the device name further contains the type of the base material, a target temperature of the surface of the base material, the injection speed, and other factors. The type of the base material is determined based on the type, size, shape, and other factors of the base material 15. The target temperature of the surface of the base material is the melting point according to the type of the base material. The target temperature of the surface of the base material is preferably the temperature that allows the injected base material 15 to be welded to a laminated material when the injected base material 15 collides with the laminated material. The injection speed is the speed at which the base material injection device 11 injects the base material 15.

The position control unit 22 controls the X-axis actuator 5, the Y-axis actuator 6, and the Z-axis actuator 7 to control the positional relationship between the head unit 3 and the base 4. Specifically, the position control unit 22 determines the amounts of control of the X-axis actuator 5, the Y-axis actuator 6, and the Z-axis actuator 7 based on the spatial coordinates specified in the process data and outputs control signals according to the amounts of control.

The base material injection device control unit 23 outputs, to the material supply device 2, a control signal for supplying the base material 15 according to the base material type specified in the process data. The base material injection device control unit 23 further outputs, to the head unit 3, a control signal for loading the supplied base material 15 into the base material injection device 11. The base material injection device control unit 23 further outputs, to the position control unit 22, an instruction of movement of the base 4 to target coordinates (spatial coordinates specified in process data).

The base material injection device control unit 23 measures the temperature of the surface of the base material 15 loaded into the base material injection device 11 based on the temperature signals successively inputted from the base material temperature sensor 31 and outputs a heating signal to the base material heating unit 11a until the measured value reaches the base material surface target temperature (melting point) specified in the process data. The base material heating unit 11a thus heats the interior 15a of the loaded base material 15 in such a way that the temperature of the interior 15a rises to a temperature below the melting point and the temperature of the surface 15b rises to the melting point. The base material injection device control unit 23 then outputs an injection signal based on the injection speed specified in the process data to the base material injection unit 11b. The base material injection unit 11b then injects the heated base material 15 toward the base 4.

Figure 4:
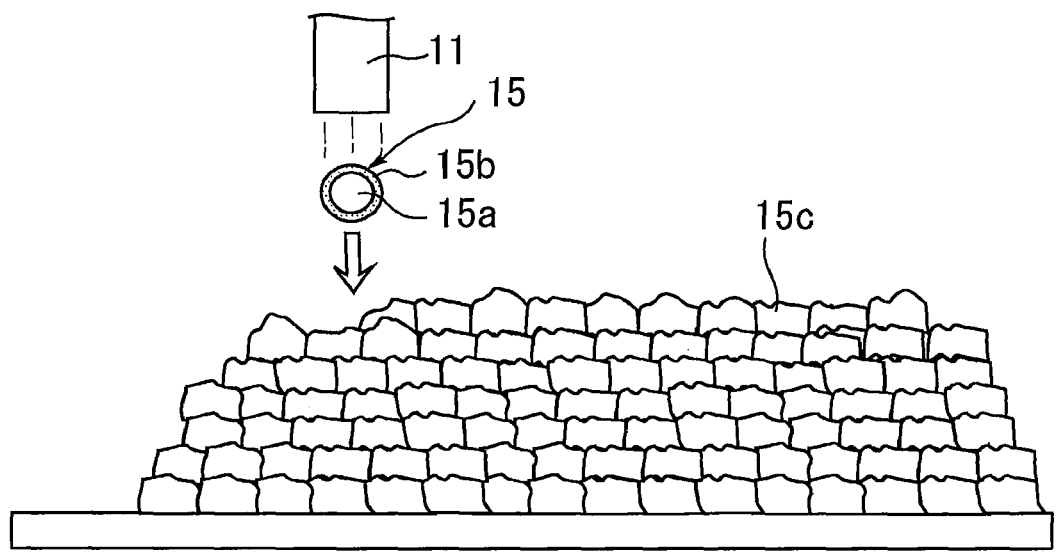
FIG. 4 is a conceptual view for describing how a base material 15 injected from a base material injection device 11 is laminated on a base 4.

FIG. 4 is a conceptual view for describing how the base material 15 injected from the base material injection device 11 is laminated on the base 4. The base material 15 is injected with only the surface 15b heated to the melting point (with interior 15a being solid), as shown in FIG. 4. The injected base material 15 collides with laminated base materials 15c injected and laminated before and is welded to the laminated base materials 15c.

<Flowchart>

Figure 5:
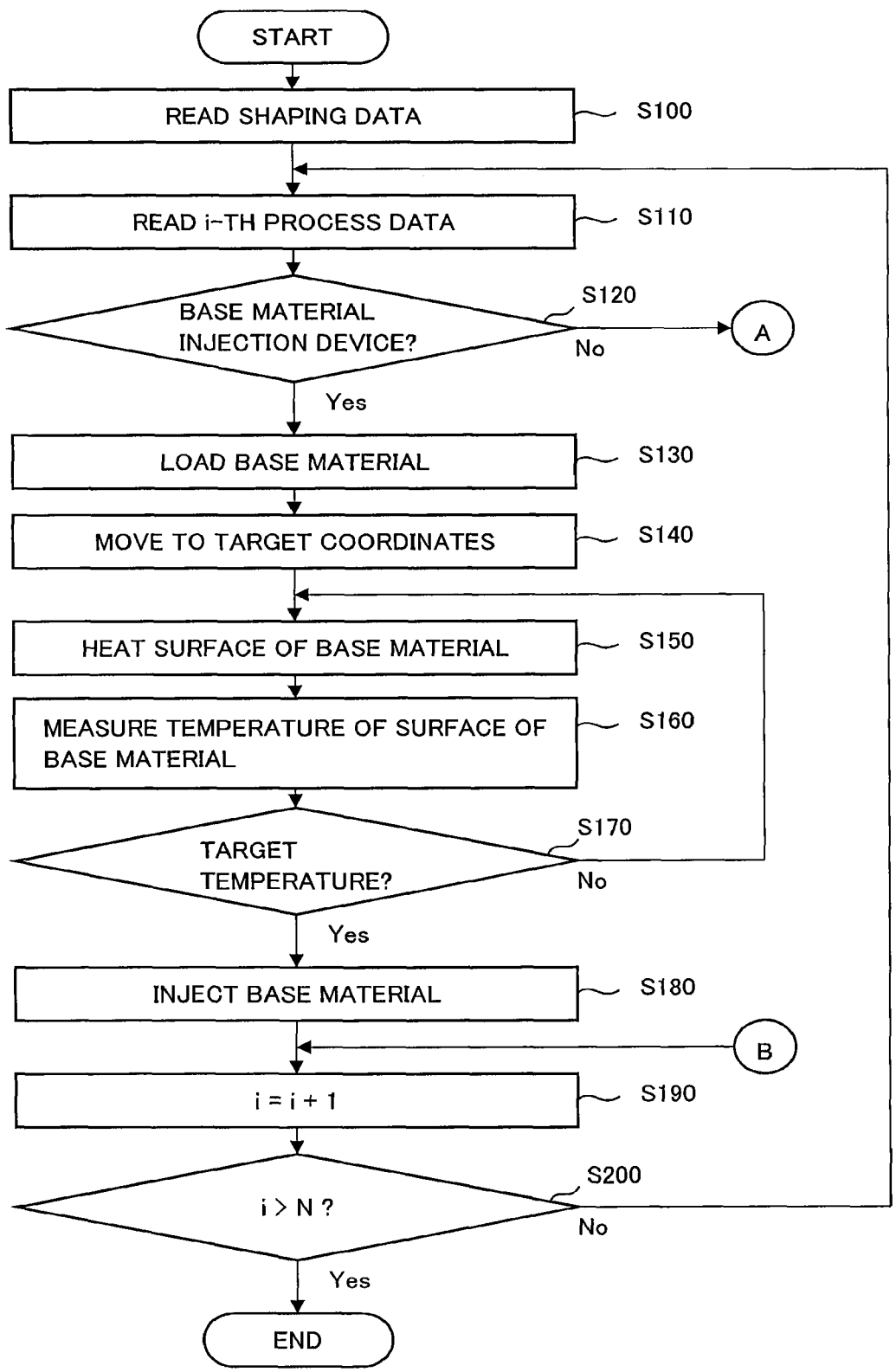
FIG. 5 is a flowchart of a control routine executed by a control device 20 in the first embodiment.

FIG. 5 is a flowchart of a control routine executed by the control device 20 in the first embodiment to achieve the actions described above.

In the routine shown in FIG. 5, the control device 20 first reads the shaping data from the shaping data storage unit 21 in step S100. The shaping data is formed of a plurality of sets of process data configured so that the execution order thereof has been determined. Let i be a variable representing the process data execution order and N be the number of sets of process data.

The control device 20 then reads i-th process data in step S110. First process data of the shaping data is first read.

The control device 20 then evaluates in step S120 whether the device name specified in the i-th process data is the base material injection device 11. In a case where the evaluation condition is satisfied, the control device 20 proceeds to the process in step S130. Processes in steps S130 to S180 relate to the base material injection device control unit 23.

In step S130, the base material injection device control unit 23 outputs, to the head unit 3, a control signal for loading the base material 15 according to the base material type specified in the i-th process data into the base material injection device 11.

The base material injection device control unit 23 then outputs in step S140 an instruction of movement of the base 4 to target coordinates (spatial coordinates specified in i-th process data) to the position control unit 22. The position control unit 22 calculates the amounts of control based on the difference between the current coordinates and the target coordinates and outputs control signals to the X-axis actuator 5, the Y-axis actuator 6, and the Z-axis actuator 7.

The base material injection device control unit 23 then outputs a heating signal to the base material injection device 11 in step S150. The base material heating unit 11a heats the surface 15b of the loaded base material 15 in accordance with the heating signal.

The base material injection device control unit 23 then measures in step S160 the current temperature of the surface of the base material 15 based on the temperature signals inputted from the base material temperature sensor 31.

The base material injection device control unit 23 then evaluates in step S170 whether the measured value measured in step S160 has reached the target temperature of the surface of the base material. The target temperature of the surface of the base material is the melting point according to the type of the base material 15 and is specified in the i-th process data.

The base material injection device control unit 23 then outputs in step S180 an injection signal based on the injection speed specified in the i-th process data to the base material injection unit 11*b*. The base material injection device 11 injects the base material 15 in accordance with the injection signal.

The control device 20 then adds 1 to the variable i in step S190.

The control device 20 then evaluates in step S200 whether the variable i is greater than the number N of sets of process data. In a case where the evaluation condition is not satisfied, the control device 20 keeps carrying out the processes in step S110 and the following steps for the (i+1)-th process data. On the other hand, in a case where the evaluation condition is satisfied, the control routine shown in FIG. 5 is terminated because the processes have been completed for all sets of process data contained in the shaping data.

In a case where the evaluation condition in step S120 is not satisfied, the control device 20 jumps from the connection point A to the connection point B in FIG. 5. The control device 20 resumes the control routine from the process in step S190.

<Effects>

As described above, the metal laminating/shaping device 1 according to the first embodiment can weld base materials 15 each having a melted surface to each other in a satisfactory manner by causing the base material injection device 11 to inject the heated preceding base material 15 based on the i-th process data and then causing the base material injection device 11 to inject the following base material 15 to the position in contact with the preceding base material 15 based on the (i+1)-th process data. A metal shaped article having a complicated structure can thus be formed at a low cost by laminating the injected base materials 15 on each other without use of a furnace or a large mold. In particular, since only the surface 15*b* is melted and welded, the amount of thermal energy consumed when a high-melting-point metal is used to form a metal shaped article can be reduced.

Further, since the base material 15 with the interior 15*a* remaining solid and only the surface 15*b* melted is laminated, there is a possibility of formation of a metal structure having a different metal composition (metal crystal structure), unlike a case where the entire base material 15 is melted.

Changing the type of the base material 15 to be injected on a process data basis allows formation of a metal shaped article formed of a plurality of metals having different properties laminated on each other. For example, a composite material plate (slab) containing difference metals can be formed and drawn for a new metal plate manufacture application.

<Variation>

In the system in the first embodiment described above, the base 4 is moved in the X-axis, Y-axis, and Z-axis directions to change the positional relationship between the base 4 and the head unit 3 in the spatial coordinate system, but the configurations of the drive devices are not limited thereto. The head unit 3 may be moved in the X-axis, Y-axis, and Z-axis directions. Further, the head unit 3 may be moved in the X-axis and Y-axis directions, and the base 4 may be moved in the Z-axis direction. This point holds true for the embodiments described below.

Figure 6:
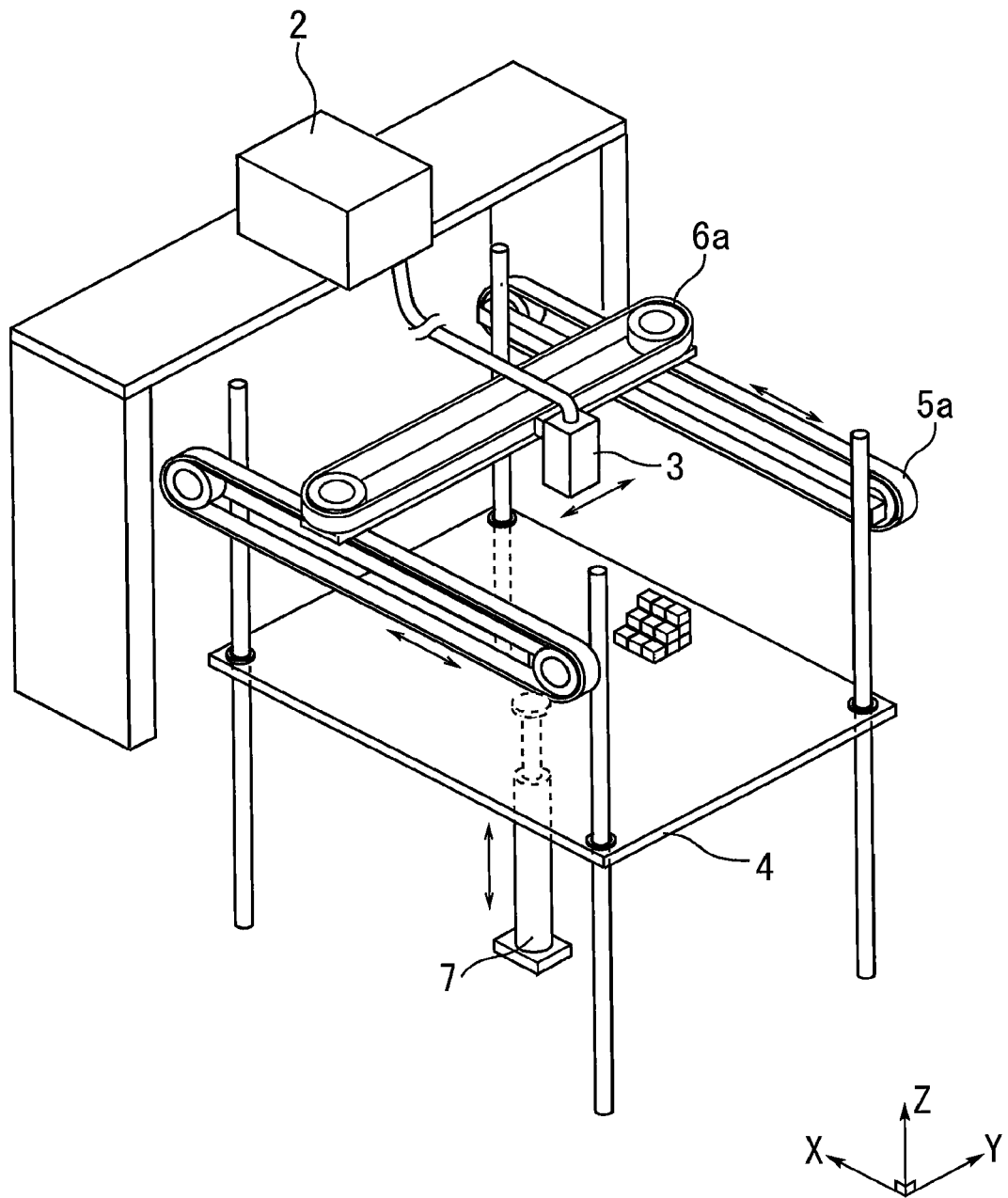
FIG. 6 is a conceptual view for describing a variation of the system configuration according to the first embodiment.

The configuration described above in which the head unit 3 is moved in the X-axis and Y-axis directions and the base 4 is moved in the Z-axis direction will be described. FIG. 6 is a conceptual view for describing a variation of the system configuration according to the first embodiment. A metal laminating/shaping device 1 shown in FIG. 6 includes an X-axis actuator 5*a* in place of the X-axis actuator 5 and a Y-axis actuator 6*a* in place of the Y-axis actuator 6. The head unit 3 is movable in the X-axis direction in accordance with force received from the X-axis actuator 5*a* and movable in the Y-axis direction in accordance with force received from the Y-axis actuator 6*a*. The base 4 is movable in the Z-axis direction in accordance with force received from the Z-axis actuator 7. The positional relationship between the base 4 and the head unit 3 can therefore be changed in the spatial coordinate system. The system shown in FIG. 6 further includes the control device 20 (not shown) having the same function as that in FIG. 1.

<Hardware Configuration>

Figure 7:
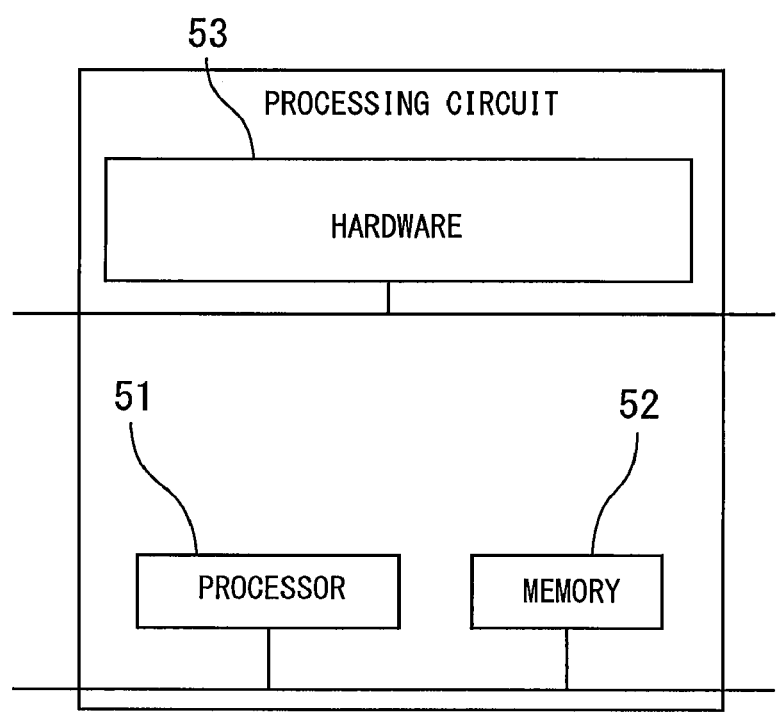
FIG. 7 shows an example of the hardware configuration of a processing circuit provided in the metal laminating/shaping device 1.

FIG. 7 shows an example of the hardware configuration of a processing circuit provided in the metal laminating/shaping device 1. Each portion of the control device 20 represents part of the functions provided in the metal laminating/shaping device 1, and the functions are each achieved by the processing circuit. For example, the processing circuit includes at least one processor 51 and at least one memory 52. For example, the processing circuit includes at least one piece of dedicated hardware 53.

In the case where the processing circuit includes the processor 51 and the memory 52, the functions are each achieved by software, firmware, or the combination of software and firmware. At least one of the software and the firmware is provided in the form of a program. At least one of the software and the firmware is stored in the memory 52. The processor 51 reads and executes the program stored in the memory 52 to achieve the functions each. The processor 51 is also called a central processing unit (CPU), a processing device, a computation device, a microprocessor, a microcomputer, and a DSP. The memory 52 is, for example, a nonvolatile or volatile semiconductor memory such as a RAM, a ROM, a flash memory, an EPROM or an EEPROM; or a magnetic disk, a flexible disk, an optical disk, a compact disk, a mini disk, a DVD or the like.

In the case where the processing circuit includes the dedicated hardware 53, the processing circuit is, for example, a single circuit, a composite circuit, a programmed processor, a parallel programmed processor, an ASIC, an FPGA, or a combination thereof. For example, the functions are each achieved by the processing circuit. For example, the functions are each achieved together by the processing circuit.

Instead, part of the functions may be each achieved by the dedicated hardware 53, and the other part of the functions may be each achieved by software or firmware.

As described above, the processing circuit achieves the functions each by using the hardware 53, software, firmware, or a combination thereof. The same hardware configuration described above is also used in the following embodiments.

Second Embodiment

<System Configuration>

A second embodiment will next be described with reference to FIGS. 8 to 11. The system in the present embodiment can be achieved by causing the control device 20 to execute the routines in FIGS. 5 and 11, which will be described later, in the configurations shown in FIGS. 1 and 9.

Figure 8:
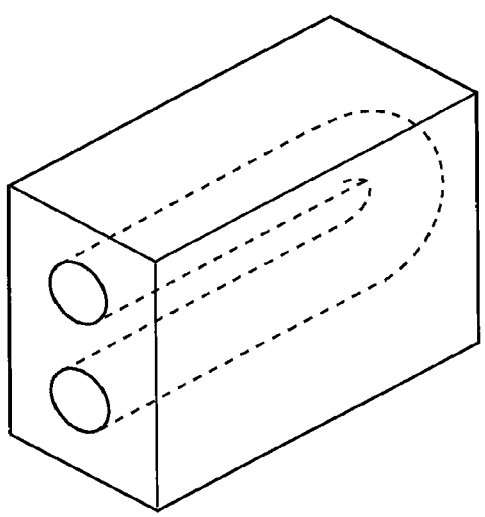
FIG. 8 shows an example of a metal shaped article having a complicated internal structure.

In the first embodiment described above, a metal shaped article can be formed by laminating the base material 15 with only the surface 15b heated to the melting point. On the other hand, there is a demand for formation of a metal shaped article having a complicated internal structure having a gap in the base materials 15 laminated on each other. FIG. 8 shows an example of a metal shaped article having a complicated internal structure. The metal shaped article shown in FIG. 8 has a pipe structure formed therein. In the system according to the second embodiment, which is intended to allow formation of a metal shaped article having a space provided therein, a device that injects an auxiliary object (auxiliary material) that can be readily removed later is provided.

Figure 9:
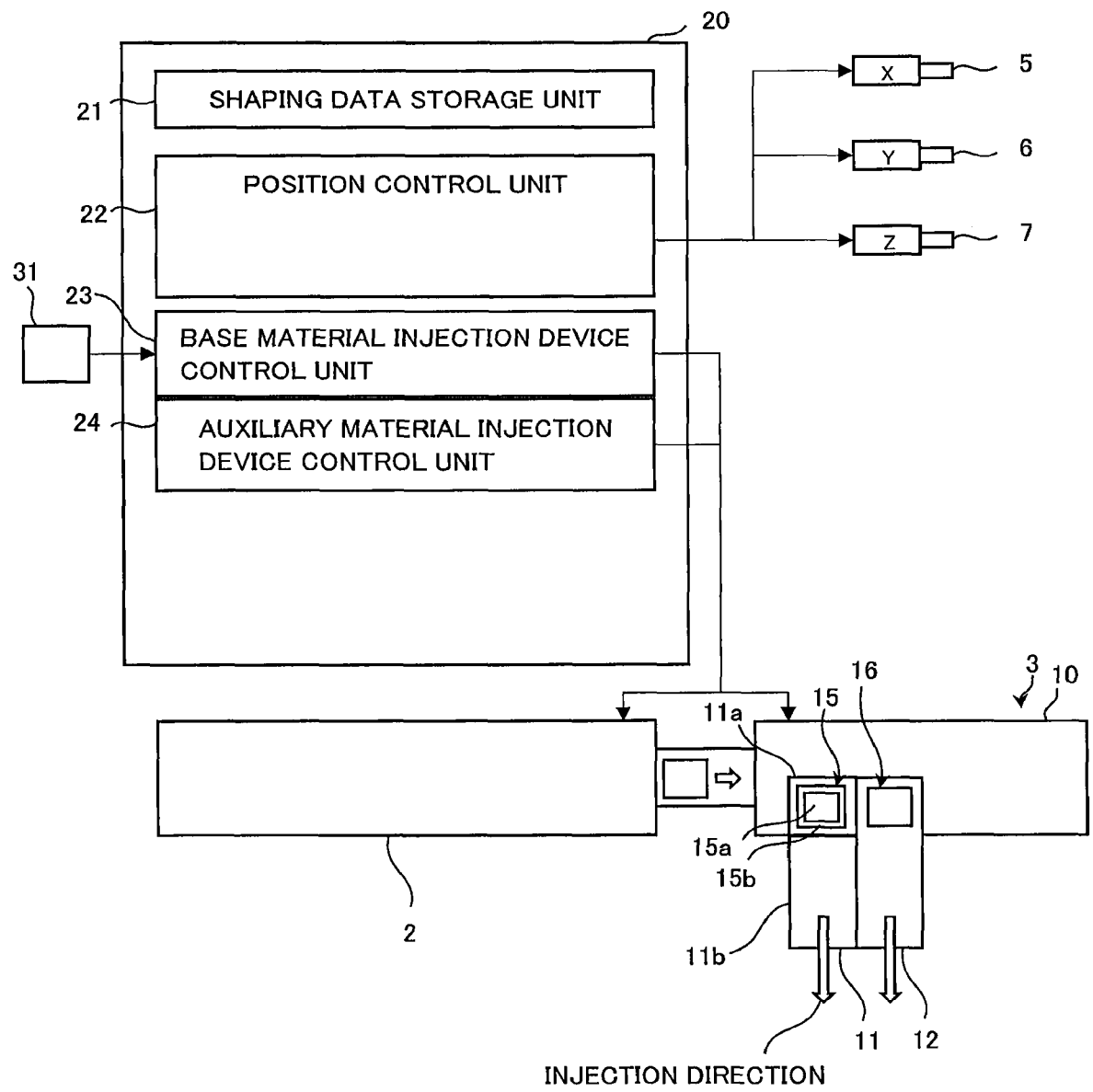
FIG. 9 is a block diagram for describing a head unit 3 and a control device 20 of a metal laminating/shaping device 1 in a second embodiment.

The system according to the second embodiment is similar to the system shown in FIG. 1. FIG. 9 is a block diagram for describing the head unit 3 and a control device 20 of a metal laminating/shaping device 1 in the second embodiment. The components shown in FIG. 9 and common to those in FIG. 2 have the same reference characters, and the description thereof will be omitted or simplified.

The material supply device 2 supplies the head unit 3 with a material. In the second embodiment, the material is formed of the base material 15 and an auxiliary material 16. The auxiliary material 16 is an auxiliary substance that can be readily removed after the shaped article is formed. The auxiliary material 16 is, for example, a metal having a melting point below that of the base material 15 or a substance having a high melting point but can be washed away with a liquid (such as clay). The auxiliary material 16 has the same shape as that of the base material 15 (FIG. 3).

The head unit 3 includes, in addition to the attachment unit 10 and the base material injection device 11 described in the first embodiment, an auxiliary material injection device 12, which is attached to the attachment unit 10. The base material 15 supplied to the head unit 3 is loaded into the base material injection device 11, and the auxiliary material 16 supplied to the head unit 3 is loaded into the auxiliary material injection device 12.

The auxiliary material injection device 12 injects the loaded auxiliary material 16. That is, the auxiliary material injection device 12 injects the auxiliary material 16, which is different in type from the base material 15 injected by the base material injection device 11. The injection line of the auxiliary material injection device 12 is directed toward the base 4. Specifically, the injection direction of the auxiliary material injection device 12 is the same as the injection direction of the base material injection device 11. The auxiliary material injection device 12 can, for example, be a device that injects an object with the aid of compressed air or a device (rail gun) that accelerates an object based on electromagnetic induction (Lorentz force) and ejects the object.

The control device 20 includes the shaping data storage unit 21, the position control unit 22, the base material injection device control unit 23, and an auxiliary material injection device control unit 24. An input unit of the control device 20 is connected to the base material temperature sensor 31, and an output unit of the control device 20 is connected to the material supply device 2, the head unit 3, the X-axis actuator 5, the Y-axis actuator 6, and the Z-axis actuator 7.

The shaping data storage unit 21 stores shaping data in advance. The shaping data contains N sets of process data ranging from data used at the start of shaping to data used at the end thereof. The process data sets are each arranged in the execution order.

The process data sets each contain at least a device name and spatial coordinates. The process data containing the base material injection device 11 as the device name further contains the type of the base material, a target temperature of the surface of the base material, the injection speed, and other factors, as described in the first embodiment. The process data containing the auxiliary material injection device 12 as the device name further contains the type of the auxiliary material, the injection speed, and other factors. The type of the auxiliary material is determined based, for example, on the type, size, shape, and other factors of the auxiliary material 16. The injection speed is the speed at which the auxiliary material injection device 12 injects the auxiliary material 16.

The auxiliary material injection device control unit 24 outputs, to the material supply device 2, a control signal for supplying the auxiliary material 16 according to the auxiliary material type specified in the process data. The auxiliary material injection device control unit 24 further outputs, to the head unit 3, a control signal for loading the supplied auxiliary material 16 into the auxiliary material injection device 12. The auxiliary material injection device control unit 24 further outputs, to the position control unit 22, an instruction of movement of the base 4 to target coordinates (spatial coordinates specified in process data). The auxiliary material injection device control unit 24 further outputs an injection signal based on the injection speed specified in the process data to the auxiliary material injection device 12. The auxiliary material injection device 12 thus injects the auxiliary material 16 toward the base 4.

Figure 10:
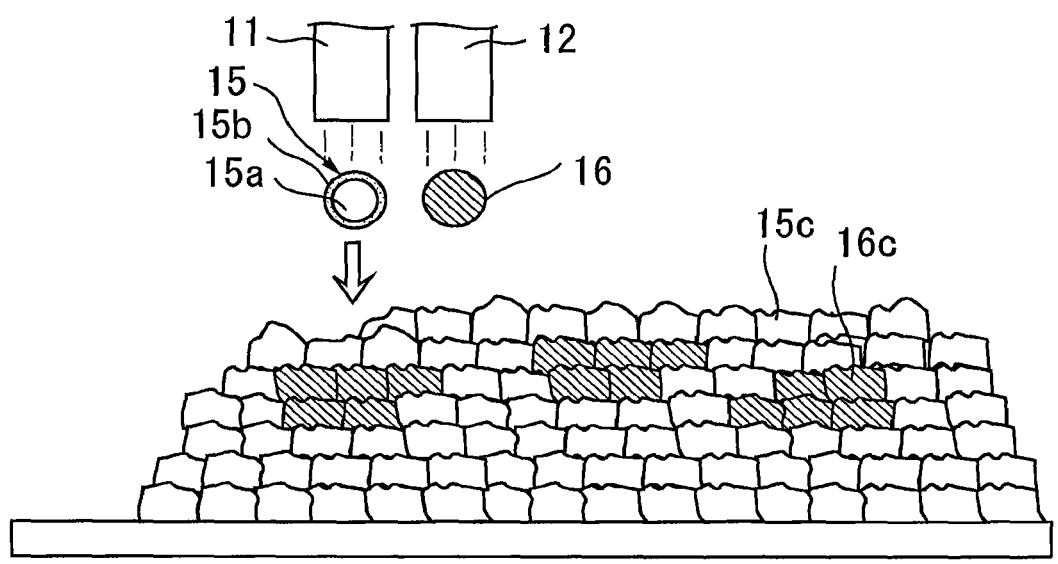
FIG. 10 is a conceptual view for describing how the injected base material 15 and an auxiliary material 16 are laminated on the base 4.

FIG. 10 is a conceptual view for describing how the injected base material 15 and auxiliary material 16 are laminated on the base 4. The base material 15 is injected with only the surface 15b heated to the melting point (with interior 15a being solid), as shown in FIG. 4. The injected base material 15 collides with the laminated base materials 15c or a laminated auxiliary material 16c injected and laminated before and is welded to the laminated base materials 15c or the laminated auxiliary material 16c. The auxiliary material 16 is injected so as to create a gap in the laminated base materials 15c. The base material 15 and the auxiliary material 16 are repeatedly injected and the auxiliary materials 16 are removed later, whereby a complicated metal shaped article having gaps created therein is formed. How to remove the auxiliary materials 16 will be described. In the case where the auxiliary material 16 is a metal having a melting point below that of the base material 15, the metal shaped article is heated so that the auxiliary materials 16, which are each a low-melting-point metal, are allowed to drop with the aid of gravity. In the case where the auxiliary material 16 is, for example, clay, the auxiliary materials 16 are removed by liquid cleaning, air spray, sucking, or any other method. A metal shaped article having an internal space can thus be formed.

<Flowchart>

Figure 11:
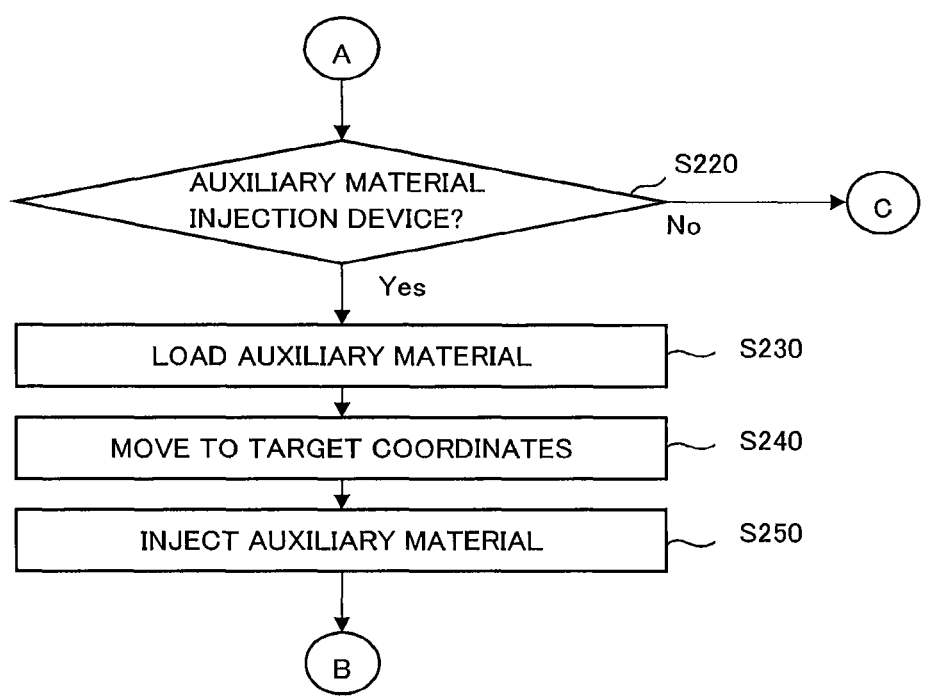
FIG. 11 is a flowchart of a control routine executed by the control device 20 in the second embodiment.

FIGS. 5 and 11 are each a flowchart of a control routine executed by the control device 20 in the second embodiment to achieve the actions described above. No description of FIG. 5 common to the description of the first embodiment will be made.

In the second embodiment, in the case where the evaluation condition in step S120 in FIG. 5 is not satisfied (connection point A), the control device 20 then proceeds to the process in step S220 in FIG. 11.

The control device 20 evaluates in step S220 whether the device name specified in the i-th process data is the auxiliary material injection device 12. In a case where the evaluation condition is satisfied, the control device 20 proceeds to the process in step S230. Processes in steps S230 to S250 relate to the auxiliary material injection device control unit 24.

In step S230, the auxiliary material injection device control unit 24 outputs, to the head unit 3, a control signal for loading the auxiliary material 16 according to the auxiliary material type specified in the i-th process data into the auxiliary material injection device 12.

The auxiliary material injection device control unit 24 then outputs in step S240 an instruction of movement of the base 4 to target coordinates (spatial coordinates specified in i-th process data) to the position control unit 22. The position control unit 22 calculates the amounts of control based on the difference between the current coordinates and the target coordinates and outputs control signals to the X-axis actuator 5, the Y-axis actuator 6, and the Z-axis actuator 7.

The auxiliary material injection device control unit 24 then outputs in step S250 an injection signal based on the injection speed specified in the i-th process data to the auxiliary material injection device 12. The auxiliary material injection device 12 injects the auxiliary material 16 in accordance with the injection signal.

Thereafter, the control routine shown in FIG. 11 is completed, and the control device 20 resumes the control routine in FIG. 5 from the process in step S190 (connection point B).

In a case where the evaluation condition in step S220 is not satisfied, the control device 20 jumps from the connection point C to the connection point B in FIG. 11. The control device 20 resumes the control routine in FIG. 5 from the process in step S190.

<Effects>

As described above, the metal laminating/shaping device 1 according to the second embodiment can repeatedly inject the base material 15 and the auxiliary material 16 and remove the auxiliary materials 16 later to form a metal shaped article having a complicated internal structure. For example, the second embodiment allows a complicated internal pipe structure to be shaped and is therefore applicable to parts of a heat exchanger and an engine. The second embodiment is also applicable to manufacture of a metal filter.

Since the base material injection device 11 and the auxiliary material injection device 12 are provided in the single head unit 3, the period required to move the head unit can be shortened as compared with a case where individual head units are switched from one to the other and the selected head unit is then moved, whereby before the previously injected material is cooled, the following material can be injected. Further, since a plurality of devices are provided in the single head unit 3 and the weight of the head unit 3 increases accordingly, the position of the head unit 3 is fixed, but the position of the base 4 is changed.

The metal laminating/shaping device 1 according to the second embodiment, of course, provides the effects described in the first embodiment.

<Variation>

In the system in the second embodiment described above, the auxiliary material injection device 12 may have the components similar to the base material heating unit 11a and the base material injection unit 11b of the base material injection device 11. According to the configuration described above, the auxiliary material 16 can be heated and then injected. This point holds true for the embodiments described below.

Third Embodiment

<System Configuration>

A third embodiment will next be described with reference to FIGS. 12 to 14. The system in the present embodiment can be achieved by causing the control device 20 to execute the routines in FIGS. 5, 11, and 14, which will be described later, in the configurations shown in FIGS. 1 and 13.

Figure 12:
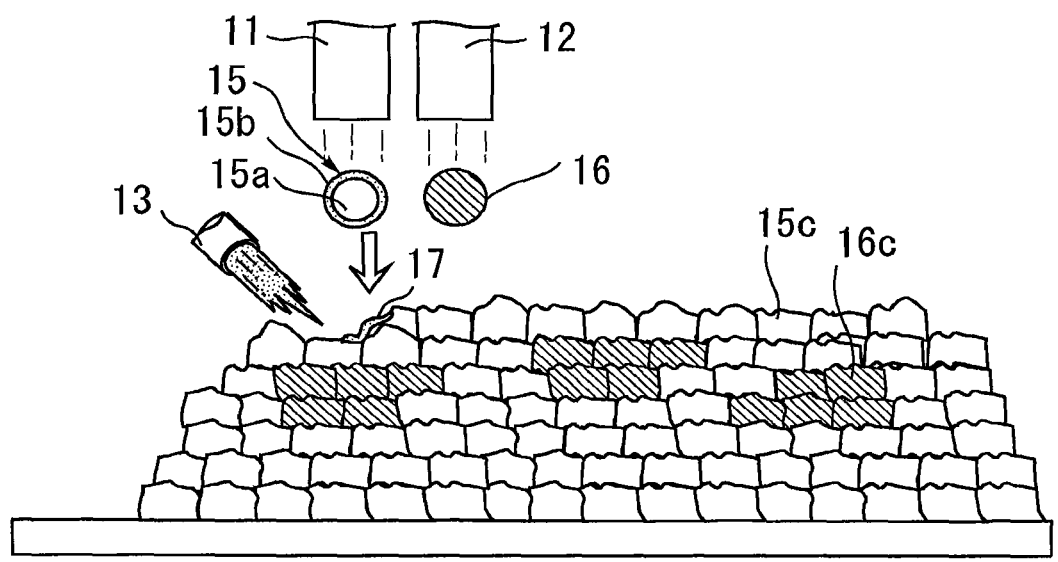
FIG. 12 is a conceptual view for describing how the base material 15 injected from the base material injection device 11 is laminated on the base 4.
Figure 13:
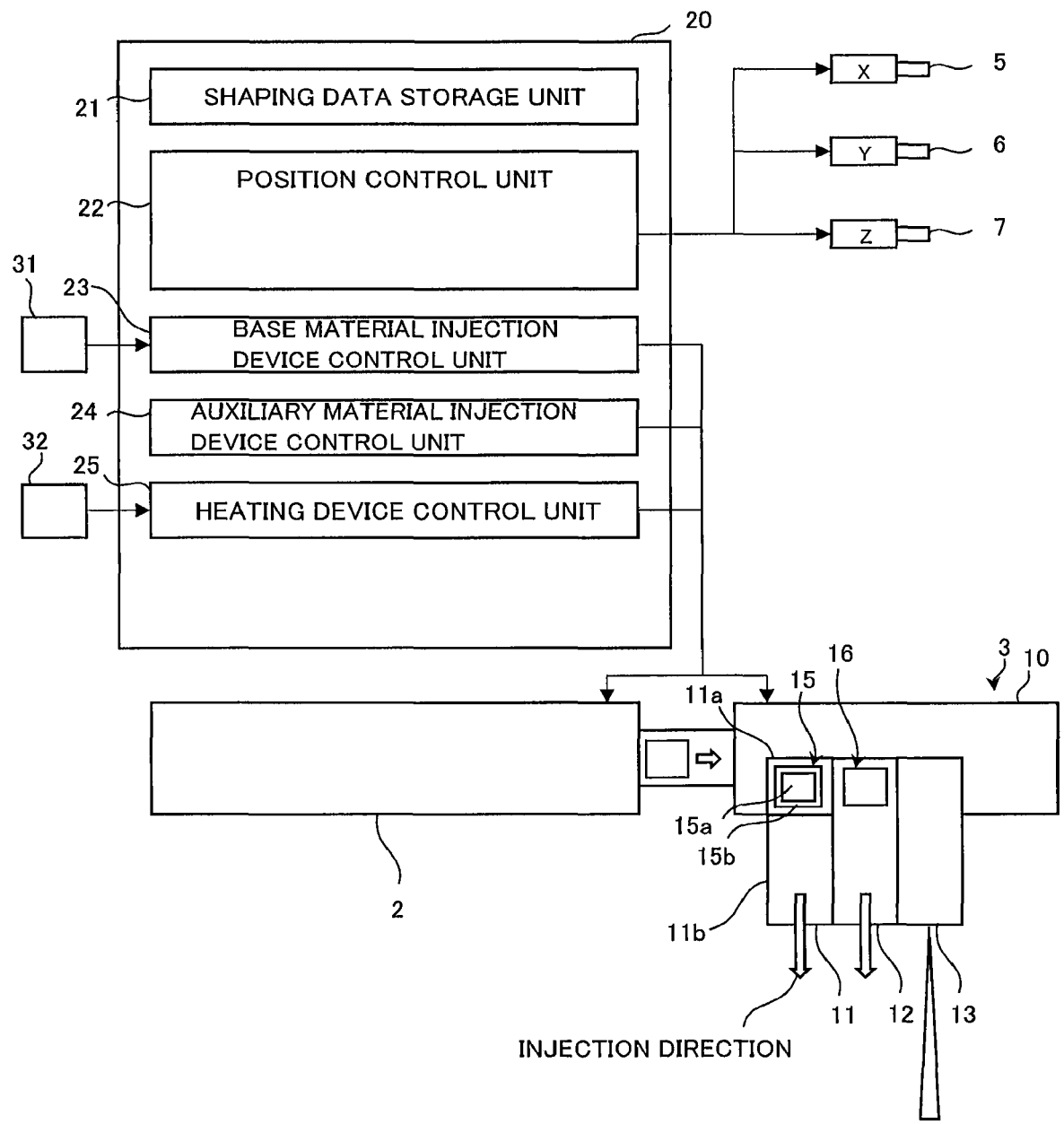
FIG. 13 is a block diagram for describing a head unit 3 and a control device 20 of a metal laminating/shaping device 1 in a third embodiment.

FIG. 12 is a conceptual view for describing how the base material 15 injected from the base material injection device 11 is laminated on the base 4. When a new base material 15 is injected onto the laminated base materials 15c, which are the injected base materials 15 welded to each other, the temperature of the surface of a collision portion 17, where the base material 15 collides with a laminated base material 15c, is not high enough in some cases. In such cases, it is desirable to heat the collision portion 17 of the laminated base material 15c to cause the collision portion 17 to melt again and then inject the following base material 15.

To this end, in a system according to the third embodiment, the surface onto which the base material 15 is ejected is heated, so that the base material 15 is likely to be fused to the laminated base material 15c.

The system according to the third embodiment is similar to the system shown in FIG. 1. FIG. 13 is a block diagram for describing the head unit 3 and a control device 20 of a metal laminating/shaping device 1 in the third embodiment. The components shown in FIG. 13 and common to those in FIG. 2 or 9 have the same reference characters, and the description thereof will be omitted or simplified.

The head unit 3 includes, in addition to the attachment unit 10, the base material injection device 11, and the auxiliary material injection device 12 described in the first and second embodiments, a heating device 13 attached to the attachment unit 10.

The heating device 13 heats the surface of any of the laminated base materials 15c laminated on the base 4. The heating device 13 needs to instantly heat the laminated base material 15c with a large amount of energy to heat only the surface of the laminated base material 15c. The heating device 13 can, for example, be a heating device to which eddy current produced by an electromagnetic coil is applied or a heating device using a laser beam.

The head unit 3 further includes a laminated base material temperature sensor 32. The laminated base material temperature sensor 32 outputs a temperature signal according to the temperature of the surface of the laminated base material 15c. The laminated base material temperature sensor 32 can, for example, be an infrared thermometer capable of measuring the temperature of the surface of the laminated base material 15c in a contactless manner.

The control device 20 includes the shaping data storage unit 21, the position control unit 22, the base material injection device control unit 23, the auxiliary material injection device control unit 24, and a heating device control unit 25. An input unit of the control device 20 is connected to the base material temperature sensor 31 and the laminated base material temperature sensor 32, and an output unit of the control device 20 is connected to the material supply device 2, the head unit 3, the X-axis actuator 5, the Y-axis actuator 6, and the Z-axis actuator 7.

The shaping data storage unit 21 stores shaping data in advance. The shaping data contains N sets of process data ranging from data used at the start of shaping to data used at the end thereof. The process data sets are each arranged in the execution order.

The process data sets each contain at least a device name and spatial coordinates. The process data containing the base material injection device 11 as the device name further contains the type of the base material, a target temperature of the surface of the base material, the injection speed, and other factors, as described in the first embodiment. The process data containing the auxiliary material injection device 12 as the device name further contains the type of the auxiliary material, the injection speed, and other factors, as described in the second embodiment. The process data containing the heating device 13 as the device name further contains a target temperature of the surface of a laminated base material (melting point according to laminated base material 15c, quenching temperature according to laminated base material 15c, and annealing temperature according to laminated base material 15c, for example).

The heating device control unit 25 outputs an instruction of movement of the base 4 to target coordinates (spatial coordinates specified in process data) to the position control unit 22. The heating device control unit 25 further measures the temperature of the surface of the laminated base material 15e in the target coordinates based on the temperature signals successively inputted from the laminated base material temperature sensor 32 and outputs a heating signal to the heating device 13 until the measured value reaches the target temperature of the surface of the laminated base material specified in the process data. The heating device 13 thus heats the surface of the laminated base material 15c in the target coordinates.

<Flowchart>

Figure 14:
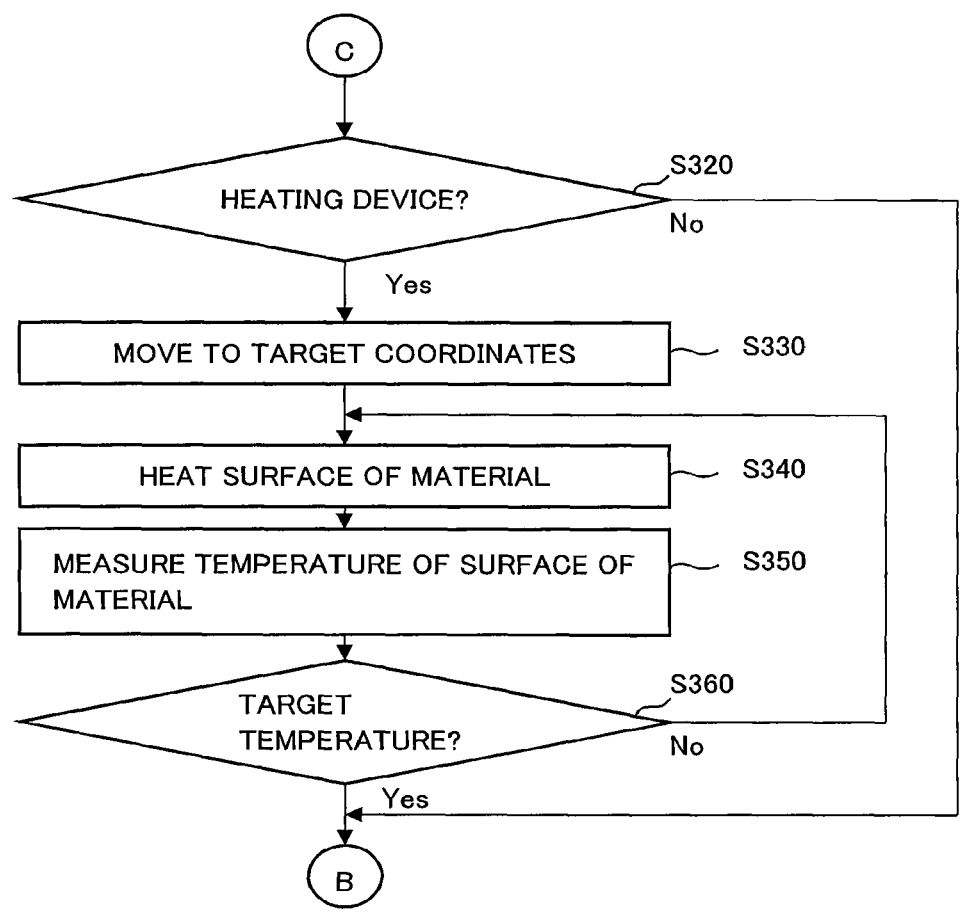
FIG. 14 is a flowchart of a control routine executed by the control device 20 in the third embodiment.

FIGS. 5, 11, and 14 are each a flowchart of a control routine executed by the control device 20 in the third embodiment to achieve the actions described above. No description of FIGS. 5 and 11 common to the description of the first and second embodiments will be made.

In the third embodiment, in the case where the evaluation condition in step S120 in FIG. 5 is not satisfied (connection point A), the control device 20 then proceeds to the process in step S220 in FIG. 11, and in the case where the evaluation condition in step S220 in FIG. 11 is not satisfied (connection point C), the control device 20 then proceeds to the process in step S320 in FIG. 14.

The control device 20 evaluates in step S320 whether the device name specified in the i-th process data is the heating device 13. In a case where the evaluation condition is satisfied, the control device 20 proceeds to the process in step S330. Processes in steps S330 to S360 relate to the heating device control unit 25.

The heating device control unit 25 outputs in step S330 an instruction of movement of the base 4 to target coordinates (spatial coordinates specified in i-th process data) to the position control unit 22. The position control unit 22 calculates the amounts of control based on the difference between the current coordinates and the target coordinates and outputs control signals to the X-axis actuator 5, the Y-axis actuator 6, and the Z-axis actuator 7.

The heating device control unit 25 then outputs in step S340 a heating signal to the heating device 13. The heating device 13 heats the surface of the laminated base material 15c in the target coordinates in accordance with the heating signal.

The heating device control unit 25 then measures in step S350 the current temperature of the surface of the laminated base material 15c in the target coordinates based on the temperature signals inputted from the laminated base material temperature sensor 32.

The heating device control unit 25 then evaluates in the step S360 whether the measured value measured in step S350 has reached the target temperature of the surface of the laminated base material. The target temperature of the surface of the laminated base material is specified in the i-th process data.

Thereafter, the control routine shown in FIG. 14 is completed, and the control device 20 resumes the control routine in FIG. 5 from the process in step S190 (connection point B).

In a case where the evaluation condition in step S320 is not satisfied, the control device 20 resumes the control routine in FIG. 5 from the process in step S190 (connection point B).

<Effects>

As described above, the metal laminating/shaping device 1 according to the third embodiment can cause the heating device 13 to heat the laminated base material 15c in the target coordinates (collision portion 17) to the melting point thereof based on the i-th process data, and then cause the base material injection device 11 to inject the base material 15 onto the laminated base material 15c in the target coordinates (collision portion 17) based on the (i+1)-th process data. That is, the base material injection device 11 injects the following base material to a position in contact with the surface of the laminated base material 15c heated by the heating device 13. As a result, the base material 15 is ejected to the collision portion 17 heated to the melting point again, whereby the base material 15 is likely to be welded to the laminated base material 15c.

Further, the metal composition (metal crystal structure) can be adjusted by causing the heating device 13 to heat the laminated base material 15c in the target coordinates to the annealing temperature thereof based on the i-th process data, and then allowing the base material 15 to naturally cool. Moreover, the surfaces of the laminated base materials 15c are melted again whenever one layer is shaped so that the surfaces are smooth.

The metal laminating/shaping device 1 according to the third embodiment, of course, provides the effects described in the first and second embodiments.

<Variation>

The system in the third embodiment described above includes the auxiliary material injection device 12 and the auxiliary material injection device control unit 24 and may instead be configured not to include these components. In this case, in the flowchart of the control routine described above, in the case where the evaluation condition in step S120 in FIG. 5 is not satisfied (connection point A), the control device 20 proceeds to the process in step S320 in FIG. 14.

Fourth Embodiment

<System Configuration>

A fourth embodiment will next be described with reference to FIGS. 15 to 17. The system in the present embodiment can be achieved by causing the control device 20 to execute the routines in FIGS. 5, 11, and 17, which will be described later, in the configurations shown in FIGS. 1 and 16.

Figure 15:
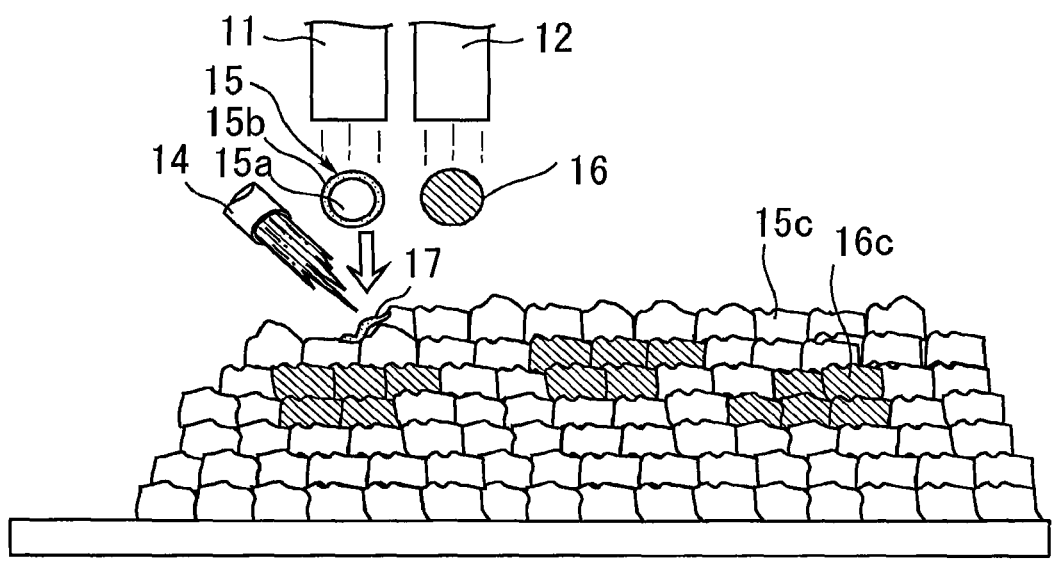
FIG. 15 is a conceptual view for describing how the base material 15 injected from the base material injection device 11 is laminated on the base 4.
Figure 16:
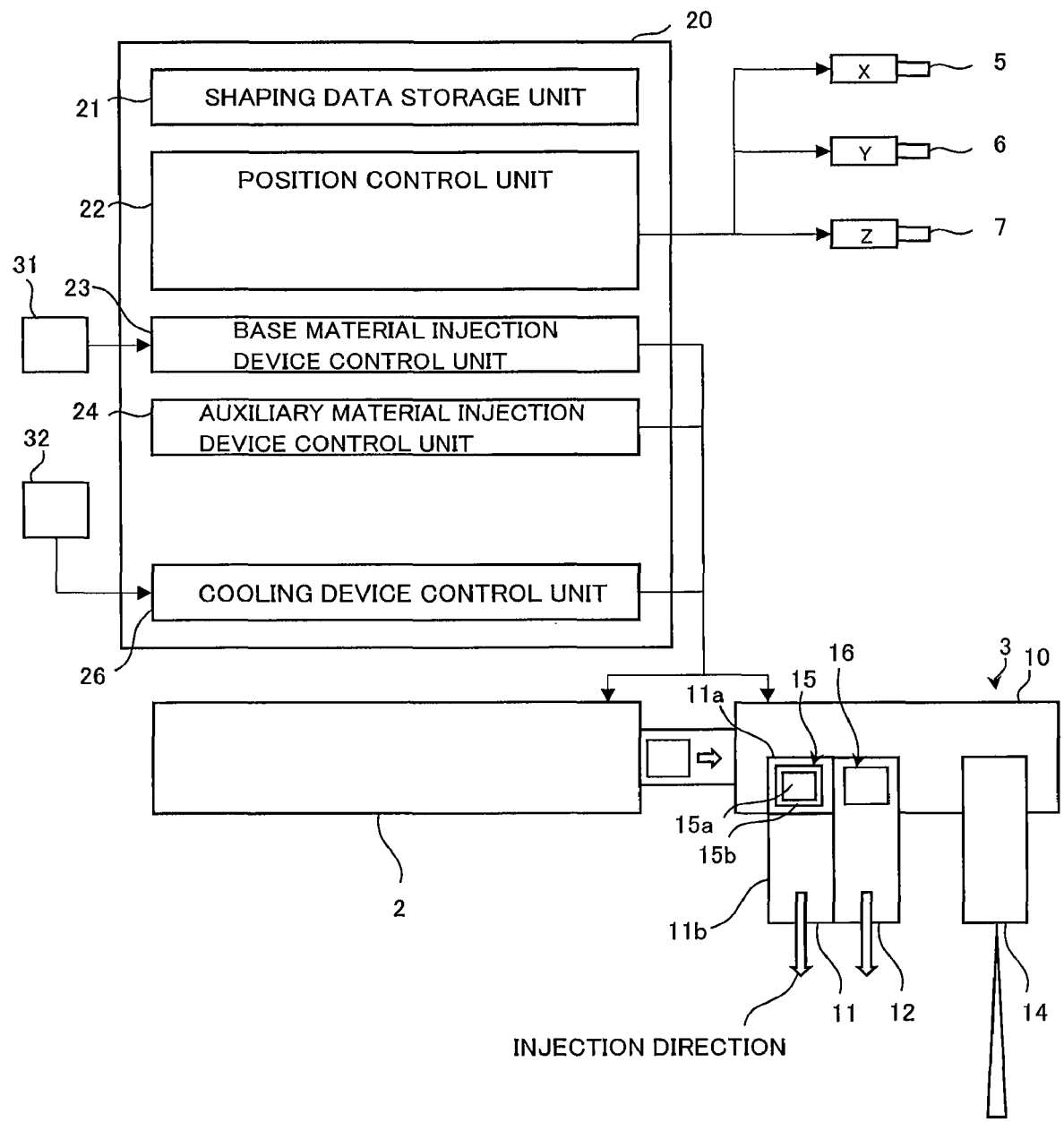
FIG. 16 is a block diagram for describing a head unit 3 and a control device 20 of a metal laminating/shaping device 1 in a fourth embodiment.

FIG. 15 is a conceptual view for describing how the base material 15 injected from the base material injection device 11 is laminated on the base 4. In a case where onto the laminated base materials 15c, which are formed by injected base materials welded to each other, is injected the base material 15 having a melting point below that of the laminated base materials 15c, the temperature of the surface of the collision portion 17, where the base material 15 collides with the laminated base material 15c, is too high (higher than melting point of base material 15) in some cases. In this case, it is desirable to cool the collision portion 17 of the laminated base material 15c and then inject the following base material 15.

To this end, in the system according to the third embodiment, the base material 15 is injected after the surface of the location to which the base material 15 is ejected is cooled.

The system according to the fourth embodiment is similar to the system shown in FIG. 1. FIG. 16 is a block diagram for describing a head unit 3 and a control device 20 of a metal laminating/shaping device 1 in the fourth embodiment. The components shown in FIG. 16 and common to those in FIG. 2 or 9 have the same reference characters, and the description thereof will be omitted or simplified.

The head unit 3 includes, in addition to the attachment unit 10, the base material injection device 11, and the auxiliary material injection device 12 described in the first and second embodiments, a cooling device 14 attached to the attachment unit 10.

The cooling device 14 cools the surface of any of the laminated base materials 15c laminated on the base 4. To temporarily cool a shaped article in the course of manufacturing a laminate, the cooling needs to be performed so as not to affect the surface of the shaped article or leave residues. The cooling device 14 can, for example, be a device that sprays carbon dioxide, air, or any other gas.

The head unit 3 further includes the laminated base material temperature sensor 32. The laminated base material temperature sensor 32 outputs the temperature signal according to the temperature of the surface of the laminated base material 15c. The laminated base material temperature sensor 32 can, for example, be an infrared thermometer capable of measuring the temperature of the surface of the laminated base material 15c in a contactless manner.

The control device 20 includes the shaping data storage unit 21, the position control unit 22, the base material injection device control unit 23, the auxiliary material injection device control unit 24, and a cooling device control unit 26. An input unit of the control device 20 is connected to the base material temperature sensor 31 and the laminated base material temperature sensor 32, and an output unit of the control device 20 is connected to the material supply device 2, the head unit 3, the X-axis actuator 5, the Y-axis actuator 6, and the Z-axis actuator 7.

The shaping data storage unit 21 stores shaping data in advance. The shaping data contains N sets of process data ranging from data used at the start of shaping to data used at the end thereof. The process data sets are each arranged in the execution order.

The process data sets each contain at least a device name and spatial coordinates. The process data containing the base material injection device 11 as the device name further contains the type of the base material, a target temperature of the surface of the base material, the injection speed, and other factors, as described in the first embodiment. The process data containing the auxiliary material injection device 12 as the device name further contains the type of the auxiliary material, the injection speed, and other factors, as described in the second embodiment. The process data containing the cooling device 14 as the device name further contains a target temperature of the surface of a laminated base material (melting point according to base material 15 to be injected next, for example).

The cooling device control unit 26 outputs an instruction of movement of the base 4 to target coordinates (spatial coordinates specified in process data) to the position control unit 22. The cooling device control unit 26 further measures the temperature of the surface of the laminated base material 15c in the target coordinates based on the temperature signals successively inputted from the laminated base material temperature sensor 32 and outputs a cooling signal to the cooling device 14 until the measured value becomes below the target temperature of the surface of the laminated base material specified in the process data. The cooling device 14 thus cools the surface of the laminated base material 15c in the target coordinates.

<Flowchart>

Figure 17:
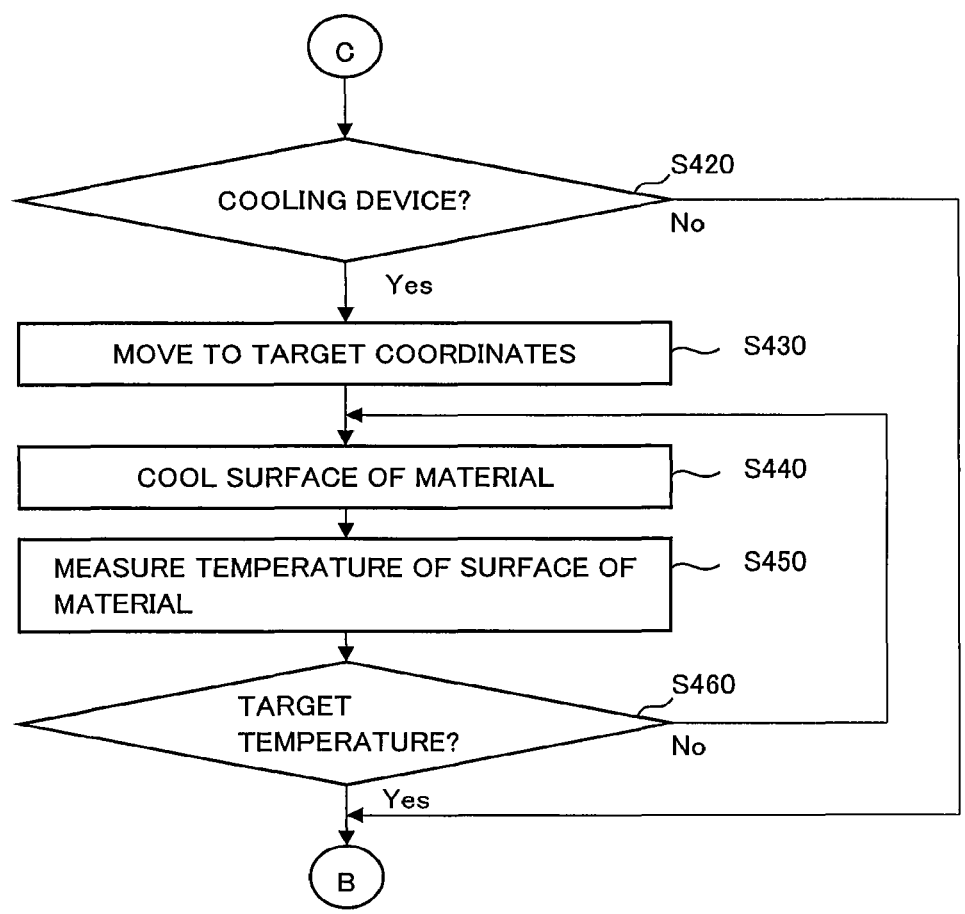
FIG. 17 is a flowchart of a control routine executed by the control device 20 in the fourth embodiment.

FIGS. 5, 11, and 17 are each a flowchart of a control routine executed by the control device 20 in the fourth embodiment to achieve the actions described above. No description of FIGS. 5 and 11 common to the description of the first and second embodiments will be made.

In the fourth embodiment, in the case where the evaluation condition in step S120 in FIG. 5 is not satisfied (connection point A), the control device 20 then proceeds to the process in step S220 in FIG. 11, and in the case where the evaluation condition in step S220 in FIG. 11 is not satisfied (connection point C), the control device 20 then proceeds to the process in step S420 in FIG. 17.

The control device 20 evaluates in step S420 whether the device name specified in the i-th process data is the cooling device 14. In a case where the evaluation condition is satisfied, the control device 20 proceeds to the process in step S430. Processes in steps S430 to S460 relate to the cooling device control unit 26.

The cooling device control unit 26 outputs in step S430 an instruction of movement of the base 4 to target coordinates (spatial coordinates specified in i-th process data) to the position control unit 22. The position control unit 22 calculates the amounts of control based on the difference between the current coordinates and the target coordinates and outputs control signals to the X-axis actuator 5, the Y-axis actuator 6, and the Z-axis actuator 7.

The cooling device control unit 26 then outputs in step S440 a cooling signal to the cooling device 14. The cooling device 14 cools the surface of the laminated base material 15c in the target coordinates in accordance with the cooling signal.

The cooling device control unit 26 then measures in step S450 the current temperature of the surface of the laminated base material 15c in the target coordinates based on the temperature signals inputted from the laminated base material temperature sensor 32.

The cooling device control unit 26 then evaluates in the step S460 whether the measured value measured in step S450 has become below the target temperature of the surface of the laminated base material. The target temperature of the surface of the laminated base material is specified in the i-th process data.

Thereafter, the control routine shown in FIG. 17 is completed, and the control device 20 resumes the control routine in FIG. 5 from the process in step S190 (connection point B).

In a case where the evaluation condition in step S420 is not satisfied, the control device 20 resumes the control routine in FIG. 5 from the process in step S190 (connection point B).

<Effects>

As described above, the metal laminating/shaping device 1 according to the fourth embodiment can cause the cooling device 14 to cool the laminated base material 15c in the target coordinates (collision portion 17) to the melting point of the base material 15 to be injected next based on the i-th process data, and then cause the base material injection device 11 to inject the base material 15 onto the laminated base material 15c in the target coordinates (collision portion 17) based on the (i+1)-th process data. That is, the base material injection device 11 injects the following base material to a position in contact with the surface of the laminated base material 15c cooled by the cooling device 14. As a result, a situation in which the interior of the base material 15 ejected to the collision portion 17 is also melted can be avoided.

Further, causing the cooling device 14 to rapidly cool the laminated base material 15c in the target coordinates allows adjustment of the metal composition (metal crystal structure) of part of the shaped article.

The metal laminating/shaping device 1 according to the fourth embodiment, of course, provides the effects described in the first and second embodiments.

<Variation>

The system in the fourth embodiment described above includes the auxiliary material injection device 12 and the auxiliary material injection device control unit 24 and may instead be configured not to include these components. In this case, in the flowchart of the control routine described above, in the case where the evaluation condition in step S120 in FIG. 5 is not satisfied (connection point A), the control device 20 proceeds to the process in step S420 in FIG. 17.

Fifth Embodiment

<System Configuration>

A Fifth embodiment will next be described with reference to FIGS. 18 to 21. The system in the present embodiment can be achieved by causing the control device 20 to execute the routines in FIGS. 5, 11, and 21, which will be described later, in the configurations shown in FIGS. 1 and 20.

Figure 18:
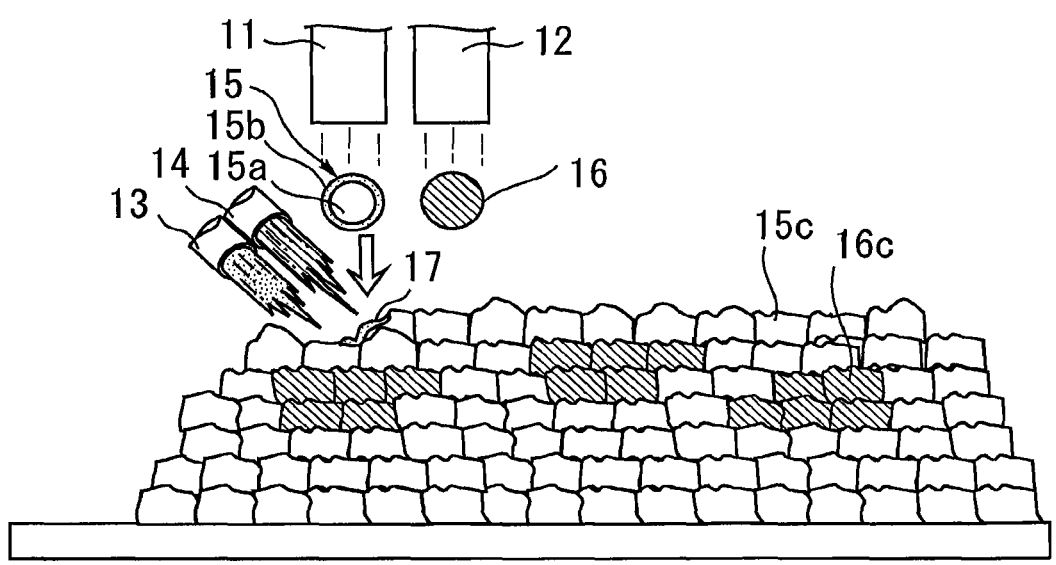
FIG. 18 is a conceptual view for describing how the base material 15 injected from the base material injection device 11 is laminated on the base 4.

FIG. 18 is a conceptual view for describing how the base material 15 injected from the base material injection device 11 is laminated on the base 4. The configuration in which the heating device 13 is provided has been described in the third embodiment, and the configuration in which the cooling device 14 is provided has been described in the fourth embodiment. The system according to the fifth embodiment employs a configuration including both devices and is therefore capable of heating and cooling the surface of the laminated base material 15c.

Figure 19:
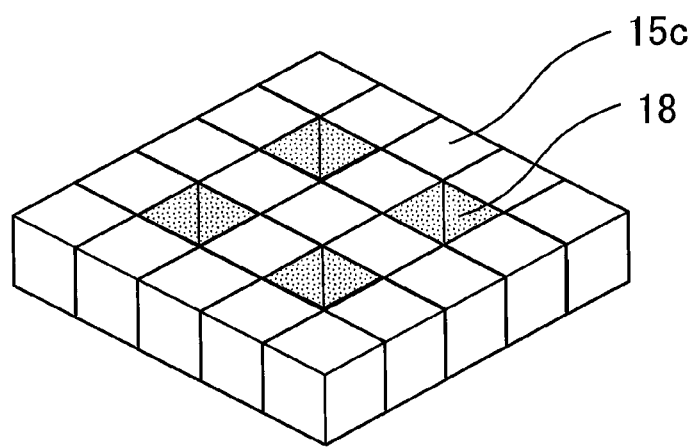
FIG. 19 shows an example of a characteristic metal shaped article formed in a fifth embodiment.

FIG. 19 shows an example of a characteristic metal shaped article formed in the fifth embodiment. The metal shaped article has a structure in which gaps 18 are locally quenched in the laminated base materials 15c. A metal laminating/shaping device 1 according to the fifth embodiment allows formation of such a metal shaped article.

Figure 20:
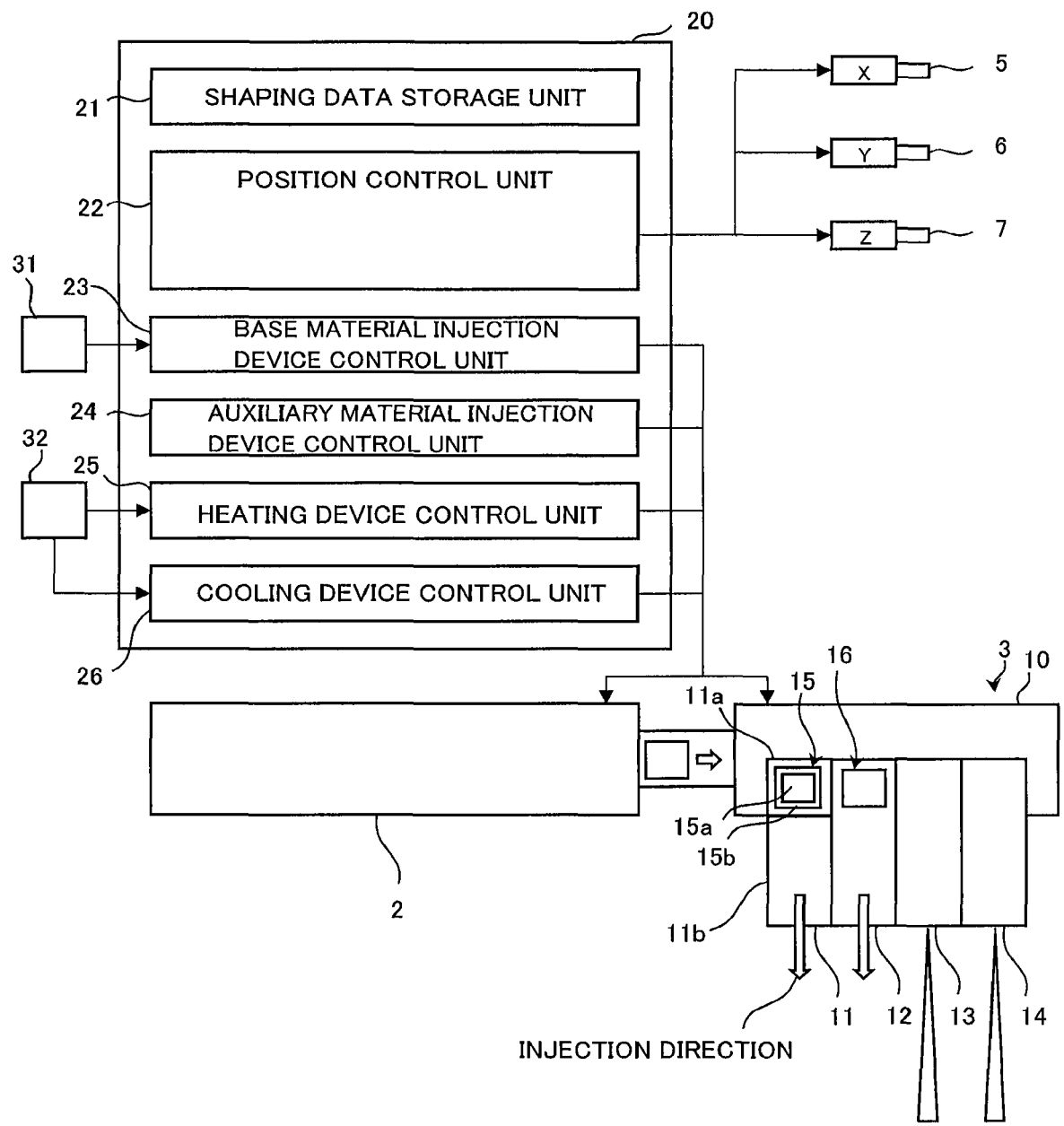
FIG. 20 is a block diagram for describing a head unit 3 and a control device 20 of a metal laminating/shaping device 1 in the fifth embodiment.

The system according to the fifth embodiment is similar to the system shown in FIG. 1. FIG. 20 is a block diagram for describing a head unit 3 and a control device 20 of the metal laminating/shaping device 1 in the fifth embodiment. The components shown in FIG. 20 and common to those in FIGS. 2, 9, 13, and 16 have the same reference characters, and the description thereof will be omitted or simplified.

The head unit 3 includes, in addition to the attachment unit 10, the base material injection device 11, and the auxiliary material injection device 12 described in the first and second embodiments, the heating device 13 attached to the attachment unit 10 and the cooling device 14 attached to the attachment unit 10.

The heating device 13 heats the surface of any of the laminated base materials 15c laminated on the base 4. The heating device 13 needs to instantly heat the laminated base material 15c with a large amount of energy to heat only the surface of the laminated base material 15c. The heating device 13 can, for example, be a heating device to which eddy current produced by an electromagnetic coil is applied or a heating device using a laser beam.

The cooling device 14 cools the surface of any of the laminated base materials 15c laminated on the base 4. To temporarily cool a shaped article in the course of manufacturing a laminate, the cooling needs to be performed so as not to affect the surface of the shaped article or leave residues. The cooling device 14 can, for example, be a device that sprays carbon dioxide, air, or any other gas.

The head unit 3 further includes the laminated base material temperature sensor 32. The laminated base material temperature sensor 32 outputs the temperature signal according to the temperature of the surface of the laminated base material 15c. The laminated base material temperature sensor 32 can, for example, be an infrared thermometer capable of measuring the temperature of the surface of the laminated base material 15c in a contactless manner.

The control device 20 includes the shaping data storage unit 21, the position control unit 22, the base material injection device control unit 23, the auxiliary material injection device control unit 24, the heating device control unit 25, and the cooling device control unit 26. An input unit of the control device 20 is connected to the base material temperature sensor 31 and the laminated base material temperature sensor 32, and an output unit of the control device 20 is connected to the material supply device 2, the head unit 3, the X-axis actuator 5, the Y-axis actuator 6, and the Z-axis actuator 7.

The shaping data storage unit 21 stores shaping data in advance. The shaping data contains N sets of process data ranging from data used at the start of shaping to data used at the end thereof. The process data sets are each arranged in the execution order.

The process data sets each contain at least a device name and spatial coordinates. The process data containing the base material injection device 11 as the device name further contains the type of the base material, a target temperature of the surface of the base material, the injection speed, and other factors, as described in the first embodiment. The process data containing the auxiliary material injection device 12 as the device name further contains the type of the auxiliary material, the injection speed, and other factors, as described in the second embodiment. The process data containing the heating device 13 as the device name further contains a target temperature of the surface of a laminated base material (melting point according to laminated base material 15c, quenching temperature according to laminated base material 15c, and annealing temperature according to laminated base material 15c, for example). The process data containing the cooling device 14 as the device name further contains a target temperature of the surface of a laminated base material (melting point according to base material 15 to be injected next, for example).

The heating device control unit 25 outputs an instruction of movement of the base 4 to target coordinates (spatial coordinates specified in process data) to the position control unit 22. The heating device control unit 25 further measures the temperature of the surface of the laminated base material 15c in the target coordinates based on the temperature signals successively inputted from the laminated base material temperature sensor 32 and outputs a heating signal to the heating device 13 until the measured value reaches the target temperature of the surface of the laminated base material specified in the process data. The heating device 13 thus heats the surface of the laminated base material 15c in the target coordinates.

The cooling device control unit 26 outputs an instruction of movement of the base 4 to target coordinates (spatial coordinates specified in process data) to the position control unit 22. The cooling device control unit 26 further measures the temperature of the surface of the laminated base material 15c in the target coordinates based on the temperature signals successively inputted from the laminated base material temperature sensor 32 and outputs a cooling signal to the cooling device 14 until the measured value becomes below the target temperature of the surface of the laminated base material specified in the process data. The cooling device 14 thus cools the surface of the laminated base material 15c in the target coordinates.

<Flowchart>

Figure 21:
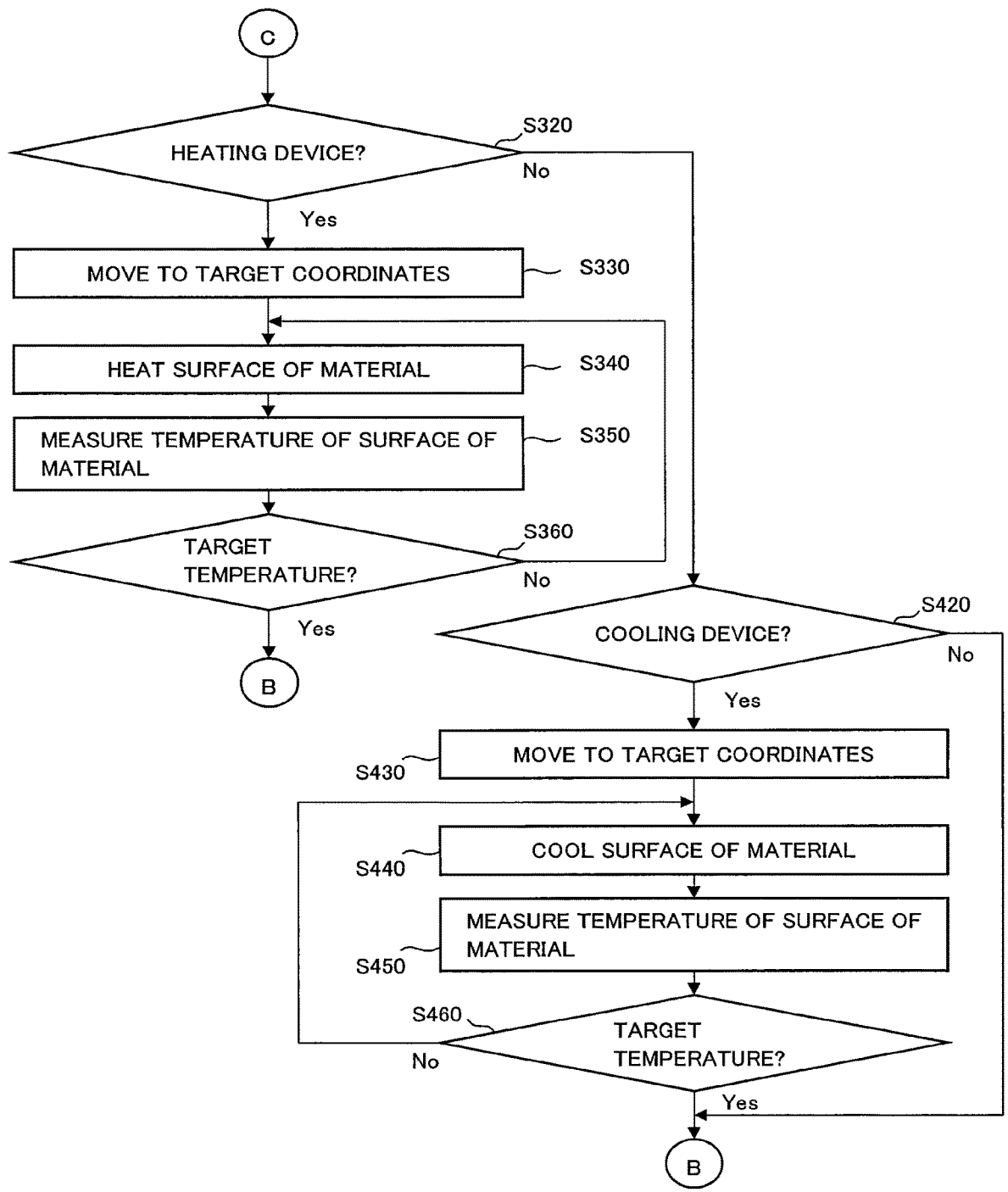
FIG. 21 is a flowchart of a control routine executed by the control device 20 in the fifth embodiment.

FIGS. 5, 11, and 21 are each a flowchart of a control routine executed by the control device 20 in the fifth embodiment to achieve the actions described above. No description of FIGS. 5 and 11 common to the description of the first and second embodiments will be made. FIG. 21 is the combination of FIG. 14 in the third embodiment and FIG. 17 in the fourth embodiment, and no description common to FIGS. 14 and 17 will therefore be made.

In the fifth embodiment, in the case where the evaluation condition in step S120 in FIG. 5 is not satisfied (connection point A), the control device 20 then proceeds to the process in step S220 in FIG. 11, and in the case where the evaluation condition in step S220 in FIG. 11 is not satisfied (connection point C), the control device 20 then proceeds to the process in step S320 in FIG. 21. In a case where the evaluation condition in step S320 is not satisfied, the control device 20 proceeds to the process in step S420. The other processes are the same as those in FIGS. 14 and 17.

<Effects>

As described above, the metal laminating/shaping device 1 according to the fifth embodiment can cause the heating device 13 to heat the laminated base material 15c in the target coordinates to the quenching temperature thereof based on the i-th process data, and the cause the cooling device 14 to rapidly cool the laminated base material 15c in the same target coordinates based on the (i+1)-th process data. As a result, the surface of the laminated base material 15c is heated by the heating device 13 to the quenching temperature, and the heated surface is then rapidly cooled by the cooling device 14. Therefore, locally quenching the laminated base material 15c whenever one layer thereof is shaped allows the lamination while quenching the internal structure of the metal shaped article, whereby the strength of the metal shaped article can be increased.

The metal laminating/shaping device 1 according to the fifth embodiment, of course, provides the effects described in the first to fourth embodiments.

<Variation>

The system in the Fifth embodiment described above includes the auxiliary material injection device 12 and the auxiliary material injection device control unit 24 and may instead be configured not to include these components. In this case, in the flowcharts of the control routines described above, in the case where the evaluation condition in step S120 in FIG. 5 is not satisfied (connection point A), the control device 20 proceeds to the process in step S320 in FIG. 21.

Sixth Embodiment

<System Configuration>

A sixth embodiment will next be described with reference to FIGS. 22 to 26. The system in the present embodiment can be achieved by causing the control device 20 to execute the routine in FIG. 25, which will be described later, in the configuration shown in FIG. 23.

Figure 22:
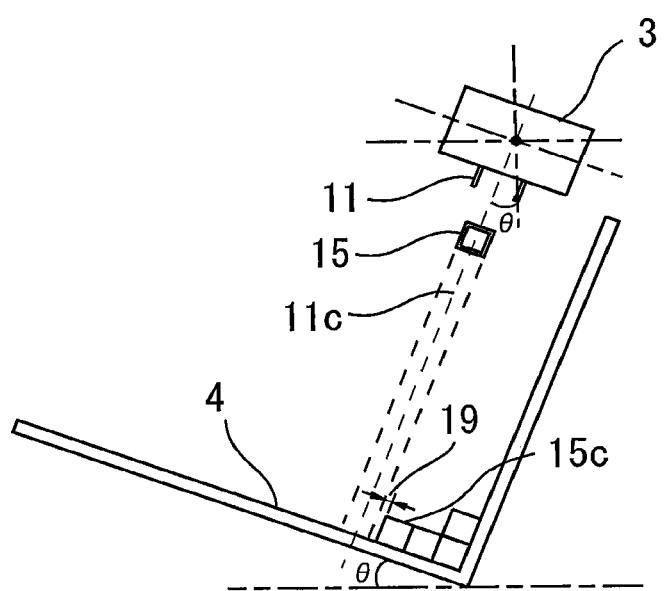
FIG. 22 is a conceptual view for describing an example of control of a metal laminating/shaping device 1 according to a sixth embodiment.

FIG. 22 is a conceptual view for describing an example of the control of a metal laminating/shaping device 1 according to the sixth embodiment. In the sixth embodiment, the head unit 3 and the base 4 are inclined by the same angle θ in the same direction with no change in the angle between the injection line 11c of the base material injection device 11 and the upper surface of the base 4. The base material 15 is then injected onto a position separate from the laminated base materials 15c by a gap 19 to allow the base material 15 having landed on the base 4 to slide toward the lower side of the inclining surface. The slide action assists the welding between the base material 15 and the laminated base materials 15c.

Figure 23:
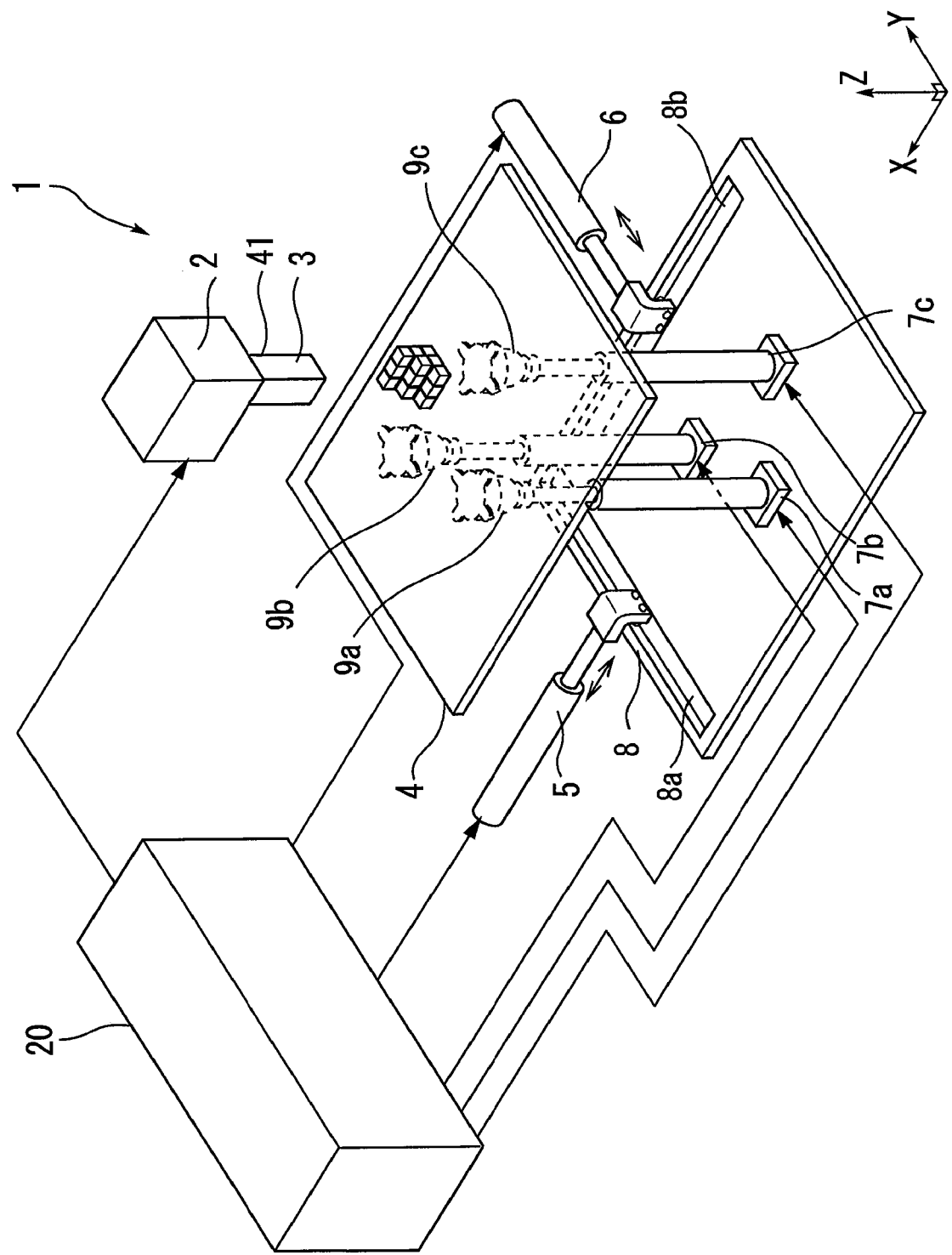
FIG. 23 is a conceptual view for describing the configuration of a system according to the sixth embodiment.

FIG. 23 is a conceptual view for describing the configuration of the system according to the sixth embodiment. The system shown in FIG. 23 has the same configuration as that shown in FIG. 1 except that the Z-axis actuator 7 is replaced with a $Z_1$-axis actuator 7a, a $Z_2$-axis actuator 7b, and a $Z_3$-axis actuator 7c and a $Z_1$-axis joint 9a, a $Z_2$-axis joint 9b, a $Z_3$-axis joint 9c, and a head actuator 41 are added. In the following description, in FIG. 23, the same components as those shown in FIG. 1 have the same reference characters, and the description thereof will be omitted or simplified.

The $Z_1$-axis actuator 7a has one end fixed to the base 4 via the $Z_1$-axis joint 9a and the other end fixed to the moving bench 8. The $Z_2$-axis actuator 7b has one end fixed to the base 4 via the $Z_2$-axis joint 9b and the other end fixed to the moving bench 8. The $Z_3$-axis actuator 7c has one end fixed to the base 4 via the $Z_3$-axis joint 9c and the other end fixed to the moving bench 8. The joints 9a to 9c are each a universal joint or a ball joint. The actuators 7a to 7c can therefore each change the inclination and height of the base 4.

The head actuator 41 is attached to an upper portion of the head unit 3. The head actuator 41 is an actuator that can be rotated around the X-axis and Y-axis directions and can change the orientation of the head unit 3.

Figure 24:
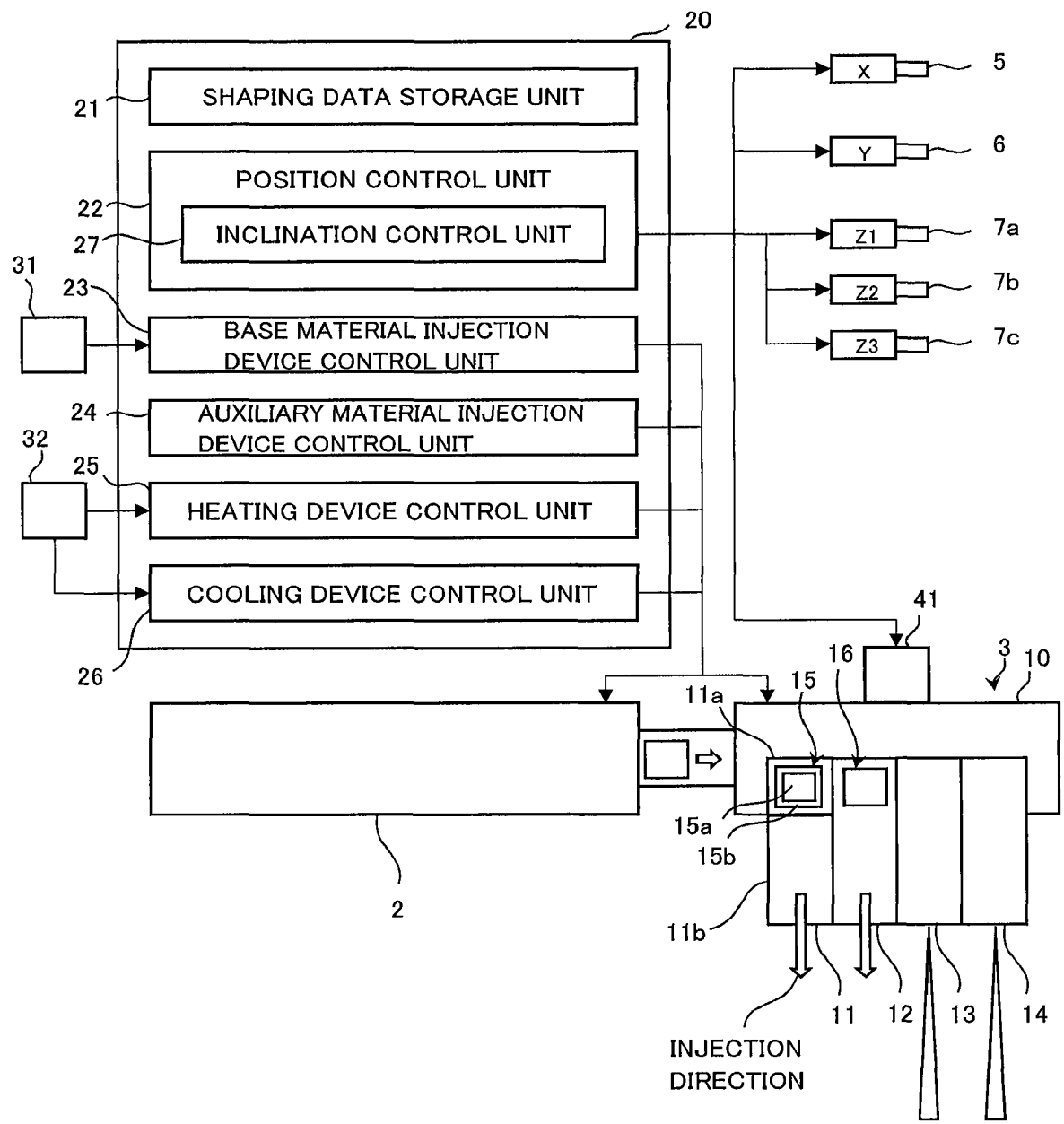
FIG. 24 is a block diagram for describing a head unit 3 and a control device 20 of the metal laminating/shaping device 1 in the sixth embodiment.

FIG. 24 is a block diagram for describing the head unit 3 and a control device 20 of the metal laminating/shaping device 1 in the sixth embodiment. The components shown in FIG. 24 and common to those in FIGS. 2, 9, 13, 16, and 20 have the same reference characters, and the description thereof will be omitted or simplified.

The control device 20 includes the shaping data storage unit 21, the position control unit 22, the base material injection device control unit 23, the auxiliary material injection device control unit 24, the heating device control unit 25, and the cooling device control unit 26. An input unit of the control device 20 is connected to the base material temperature sensor 31 and the laminated base material temperature sensor 32, and an output unit of the control device 20 is connected to the material supply device 2, the head unit 3, the X-axis actuator 5, the Y-axis actuator 6, the $Z_1$-axis actuator 7a, the $Z_2$-axis actuator 7b, the $Z_3$-axis actuator 7c, and the head actuator 41.

The shaping data storage unit 21 stores shaping data in advance. The shaping data contains N sets of process data ranging from data used at the start of shaping to data used at the end thereof. The process data sets are each arranged in the execution order.

The process data sets each contain at least a device name, spatial coordinates, and inclination information. The process data containing the base material injection device 11 as the device name further contains the type of the base material, a target temperature of the surface of the base material, the injection speed, and other factors, as described in the first embodiment. The process data containing the auxiliary material injection device 12 as the device name further contains the type of the auxiliary material, the injection speed, and other factors, as described in the second embodiment. The process data containing the heating device 13 as the device name further contains a target temperature of the surface of a laminated base material (melting point according to laminated base material 15c, quenching temperature according to laminated base material 15c, and annealing temperature according to laminated base material 15c, for example), as described in the third embodiment. The process data containing the cooling device 14 as the device name further contains a target temperature of the surface of a laminated base material (melting point according to base material 15 to be injected next, for example), as described in the fourth embodiment.

The position control unit 22 includes an inclination control unit 27. The inclination control unit 27 controls the $Z_1$-axis actuator 7a, the $Z_2$-axis actuator 7b, the $Z_3$-axis actuator 7c, and the head actuator 41 to incline the head unit 3 and the base 4 by the same angle in the same direction. Specifically, the inclination control unit 27 determines the amounts of control of the $Z_1$-axis actuator 7a, the $Z_2$-axis actuator 7b, the $Z_3$-axis actuator 7c, and the head actuator 41 based on the inclination information specified in the process data and outputs control signals according to the amounts of control.

The $Z_1$-axis actuator 7a, the $Z_2$-axis actuator 7b, the $Z_3$-axis actuator 7c, the head actuator 41, and the inclination control unit 27 function as an inclination device that inclines the head unit 3 and the base 4 by the same angle θ in the same direction with no change in the angle between the injection line 11c of the base material injection device 11 and the upper surface of the base 4.

<Flowchart>

Figure 25:
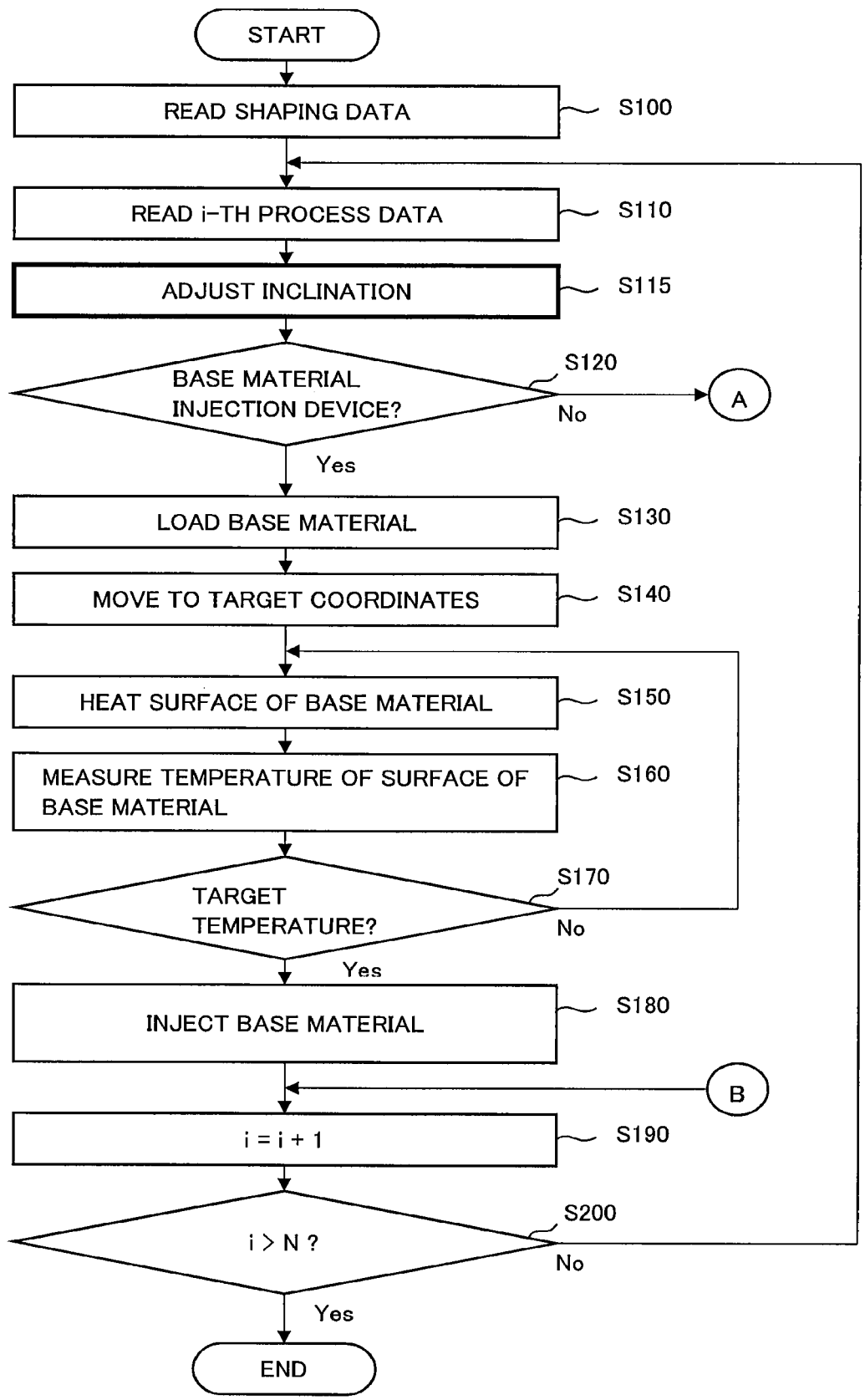
FIG. 25 is a flowchart of a control routine executed by the control device 20 in the sixth embodiment.

FIG. 25 is a flowchart of a control routine executed by the control device 20 in the sixth embodiment to achieve the actions described above. The control routine shown in FIG. 25 is the same as the control routine shown in FIG. 5 except that the process in step S115 is added as a process between the step S110 and step S120. The same steps as those shown in FIG. 5 have the same reference characters, and the description thereof will be omitted or simplified.

In step S115, the control device 20 outputs an instruction of adjustment of the inclination of the head unit 3 and the base 4 to the inclination control unit 27. The inclination control unit 27 outputs control signals to the $Z_1$-axis actuator 7a, the $Z_2$-axis actuator 7b, the $Z_3$-axis actuator 7c, and the head actuator 41 based on the inclination information specified in the i-th process data.

In the case where the evaluation condition in step S120 in FIG. 5 is not satisfied (connection point A), the control device 20 then proceeds to the process in step S220 in FIG. 11, and in the case where the evaluation condition in step S220 in FIG. 11 is not satisfied (connection point C), the control device 20 then proceeds to the process in step S320 in FIG. 21. In the case where the evaluation condition in step S320 is not satisfied, the control device 20 proceeds to the process in step S420.

<Effects>

The metal laminating/shaping device 1 according to the sixth embodiment can incline the head unit 3 and the base 4 by the same angle in the same direction, as described above. A first base material can be injected onto the inclining surface based on the i-th process data, and a second base material can then be injected onto a position on the inclining surface higher than the position of the first base material based on the (i+1)-th process data. The second base material slides with the aid of gravity toward the lower side of the inclining surface and is welded to the first base material.

<Variation>

In the system in the sixth embodiment described above, the base 4 is moved in the X-axis, Y-axis, and Z-axis directions to change the positional relationship between the base 4 and the head unit 3 in the spatial coordinate system, but the configurations of the drive devices are not limited to those described above. The head unit 3 may be moved in the X-axis, Y-axis, and Z-axis directions. Further, the head unit 3 may be moved in the X-axis and Y-axis directions, and the base 4 may be moved in the Z-axis direction.

Figure 26:
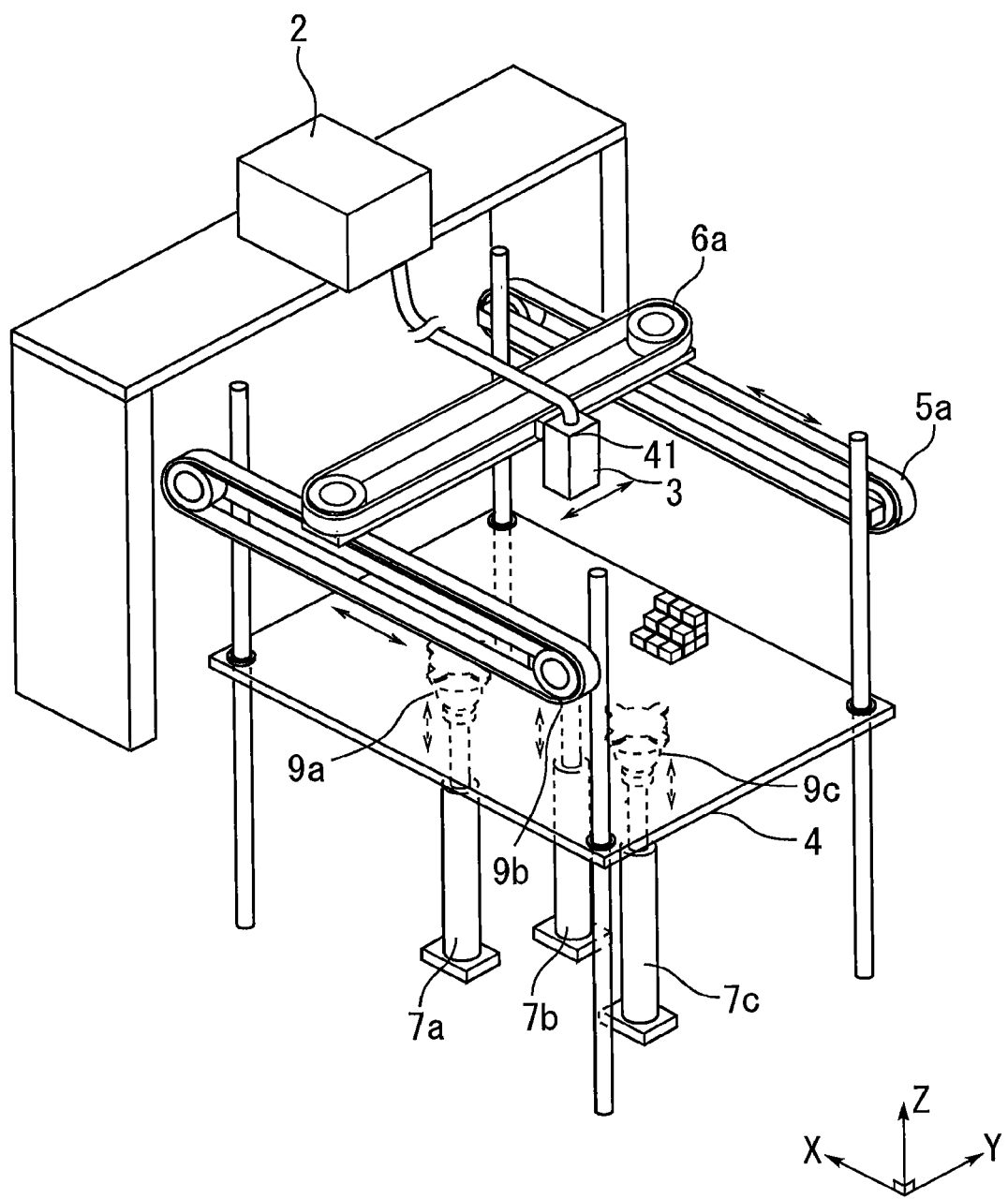
FIG. 26 is a conceptual view for describing a variation of the system configuration according to the sixth embodiment.

A description will be made of the configuration in which the head unit 3 is moved in the X-axis and Y-axis directions and the base 4 is moved in the Z-axis direction described above. FIG. 26 is a conceptual view for describing a variation of the system configuration according to the sixth embodiment. A metal laminating/shaping device 1 shown in FIG. 26 includes the X-axis actuator 5a in place of the X-axis actuator 5 in FIG. 1 and the Y-axis actuator 6a in place of the Y-axis actuator 6. The head unit 3 is movable in the X-axis direction in accordance with force received from the X-axis actuator 5a and movable in the Y-axis direction in accordance with force received from the Y-axis actuator 6a. The base 4 is movable in the Z-axis direction in accordance with force received from the $Z_1$-axis actuator 7a, the $Z_2$-axis actuator 7b, and the $Z_3$-axis actuator 7c. The positional relationship between the base 4 and the head unit 3 can therefore be changed in the spatial coordinate system. The system shown in FIG. 26 further includes the control device 20 (not shown) having the same function as that in FIG. 24.

The system in the sixth embodiment described above includes the auxiliary material injection device 12, the heating device 13, and the cooling device 14 and may instead be configured not to include these components. That is, the configuration in the sixth embodiment is applicable to the configuration described in any of the first to fifth embodiments.

REFERENCE SIGNS LIST

1 Metal laminating/shaping device
2 Material supply device
3 Head unit
4 Base
5, 5a X-axis actuator
6, 6a Y-axis actuator
7 Z-axis actuator
7a, 7b, 7c $Z_1$-axis actuator, $Z_2$-axis actuator, $Z_3$-axis actuator
8 Moving bench 8a, 8b Hole
9a, 9b, 9c $Z_1$-axis joint, $Z_2$-axis joint, $Z_3$-axis joint
10 Attachment unit
11 Base material injection device
11a Base material heating unit
11b Base material injection unit
11c Injection line
12 Auxiliary material injection device
13 Heating device
14 Cooling device
15, 15a, 15b Base material, interior, surface (surface layer)
15c Laminated base material
16 Auxiliary material
16c Laminated auxiliary material
17 Collision portion
20 Control device
21 Shaping data storage unit
22 Position control unit
23 Base material injection device control unit
24 Auxiliary material injection device control unit
25 Heating device control unit
26 Cooling device control unit
27 Inclination control unit
31 Base material temperature sensor
32 Laminated base material temperature sensor
41 Head actuator
51 Processor
52 Memory
53 Hardware

The invention claimed is:

1. A metal laminating/shaping device comprising:
a base;
a head including a base material injection device, the base material injection device including a base material heater and a base material injector;
a driver that changes a positional relationship between the base and the head in a spatial coordinate system; and
circuitry configured to:
control the base material heater to heat pieces of base material, each piece of the base material being a metal piece having a fixed shape and heated in such a way that a temperature of an interior of the piece of base material is raised to a temperature below a melting point of the piece of base material and a temperature of only a surface layer of the piece of base material is raised to the melting point of the piece of base material, and
control the base material injector to shoot the pieces of base material heated by the base material heater piece by piece toward target coordinates of the base.

2. The metal laminating/shaping device according to claim 1, wherein
the head further includes an auxiliary material injector that shoots a piece of auxiliary material different from the piece of base material shot by the base material injection device in terms of a material type.

3. The metal laminating/shaping device according to claim 1, wherein
the head further includes another heater that heats a surface of a laminated base material laminated on the base at the target coordinates.

4. The metal laminating/shaping device according to claim 3, wherein
the base material injection device shoots a following base material to a position in contact with the surface of the laminated base material heated by the heater.

5. The metal laminating/shaping device according to claim 3, wherein
the head further includes a cooler that cools the surface of the laminated base material laminated on the base at the target coordinates, and
the laminated base material is heated by the heater so that a temperature of the surface of the laminated base material at the target coordinates is raised to a quenching temperature, and the heated surface of the laminated base material at the target coordinates is cooled by the cooler.

6. The metal laminating/shaping device according to claim 1, wherein
the head further includes a cooler that cools a surface of a laminated base material laminated on the base at the target coordinates.

7. The metal laminating/shaping device according to claim 6, wherein
the base material injection device shoots a following base material to a position in contact with the surface of the laminated base material cooled by the cooler.

8. The metal laminating/shaping device according to claim 1, wherein
the metal laminating/shaping device further comprises an incliner that includes a head actuator capable of changing orientation of the head including the base material injection device, a base actuator capable of changing inclination and height of the base, and the incliner inclines the head and the base by a same angle in a same direction with no change in an angle between an injection line of the base material injection device and an upper surface of the base by using the head actuator and the base actuator.

9. The metal laminating/shaping device according to claim 8, wherein
the base material injection device shoots, after injecting a preceding base material onto the base, a following base material onto an inclining surface of the base inclined by the incliner and in a position higher than the preceding base material.

10. The metal laminating/shaping device according to claim 1, wherein
the metal piece has a fixed shape which is a bullet-like shape.

11. The metal laminating/shaping device according to claim 1, wherein
the head is located in a fixed position, and
the driver changes a position of the base.

12. The metal laminating/shaping device according to claim 1, wherein the fixed shape is a spherical shape, a cuboid shape, a bullet-like shape in which a cone is added to a lower surface of a circular column, or a bullet-like shape in which a regular pyramid is added to a lower surface of a cuboid.

13. The metal laminating/shaping device according to claim 1, wherein a thickness of the surface layer is 0.1% to 10% of a length of one side or diameter of the piece of base material.

14. The metal laminating/shaping device according to claim 1, wherein the base material heater is a heater to which eddy current produced by an electromagnetic coil is applied or a heater using a laser beam.

* * * * *